(12) United States Patent
Bateman et al.

(10) Patent No.: US 10,205,914 B2
(45) Date of Patent: Feb. 12, 2019

(54) WIRELESS VIDEO CAMERA AND CONNECTION METHODS INCLUDING MULTIPLE VIDEO OR AUDIO STREAMS

(71) Applicant: Logitech Europe S.A., Lausanne (CH)

(72) Inventors: John Bateman, San Francisco, CA (US); Oleg Ostap, Fremont, CA (US); Oliver Hoheisel, Menlo Park, CA (US); David Kim, Fremont, CA (US); Vijay Karnataki, Fremont, CA (US)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 15/799,989

(22) Filed: Oct. 31, 2017

(65) Prior Publication Data

US 2018/0098035 A1 Apr. 5, 2018

Related U.S. Application Data

(62) Division of application No. 13/960,241, filed on Aug. 6, 2013, now Pat. No. 9,838,651.
(Continued)

(51) Int. Cl.
*H04N 5/232* (2006.01)
*H04N 5/76* (2006.01)
(Continued)

(52) U.S. Cl.
CPC ............ *H04N 7/181* (2013.01); *G06F 3/005* (2013.01); *G06F 13/385* (2013.01);
(Continued)

(58) Field of Classification Search
CPC .... H04N 7/181; H04N 7/185; H04N 5/23203; H04N 5/23206; G11B 2020/10527;
(Continued)

(56) References Cited

U.S. PATENT DOCUMENTS 6,295,002 B1 9/2001 Fukuda
6,783,071 B2 8/2004 Levine et al.
(Continued)

FOREIGN PATENT DOCUMENTS

CN 1450763 A 10/2003
CN 1801787 A 7/2006
(Continued)

OTHER PUBLICATIONS

Vainio, "Bluetooth Security", May 25, 2000, 15 Pages.
(Continued)

*Primary Examiner* — Ngoc Yen T Vu
(74) *Attorney, Agent, or Firm* — Kilpatrick Townsend & Stockton LLP

(57) ABSTRACT

Systems and methods for streaming video and/or audio from wireless cameras are provided. Methods may include, at a network camera, receiving an instruction to begin video capture from a first network node, including information identifying a second network node. A first video stream may be sent from the network camera to the first network node, and a second video stream may be simultaneously sent to the second network node. The first and second video streams may be based on common video capture data, and may be sent at different bitrates, different resolutions, different frame-rates, and/or different formats. A parameter of the second video stream may be adjusted in response to performance data received from the second network node or another network node.

20 Claims, 14 Drawing Sheets

Related U.S. Application Data

(60) Provisional application No. 61/681,981, filed on Aug. 10, 2012, provisional application No. 61/713,429, filed on Oct. 12, 2012, provisional application No. 61/713,440, filed on Oct. 12, 2012.

(51) Int. Cl.
  *H04N 7/18* (2006.01)
  *H04L 29/06* (2006.01)
  *G06F 3/00* (2006.01)
  *G06F 13/38* (2006.01)

(52) U.S. Cl.
  CPC ..... *H04L 65/1069* (2013.01); *H04N 5/23206* (2013.01); *H04N 5/23222* (2013.01); *H04N 5/23232* (2013.01)

(58) Field of Classification Search
  CPC ........... G11B 2020/10537; G11B 2020/10546; G11B 2020/10555
  USPC ...................................................... 348/231.4
  See application file for complete search history.

(56) References Cited

U.S. PATENT DOCUMENTS

| | | | |
|---|---|---|---|
| 7,158,075 | B2 | 1/2007 | Nakamura |
| 7,356,565 | B2 | 4/2008 | Zimmermann et al. |
| 8,217,986 | B2 | 7/2012 | Nimri |
| 8,237,764 | B1 | 8/2012 | Chen et al. |
| 8,296,472 | B2 | 10/2012 | Cota-Robles et al. |
| 8,640,216 | B2 | 1/2014 | Anderson et al. |
| 9,010,622 | B2 | 4/2015 | Kim |
| 9,128,947 | B2 | 9/2015 | Raina |
| 2003/0179301 | A1 | 9/2003 | Feldis et al. |
| 2003/0208543 | A1 | 11/2003 | Enete et al. |
| 2004/0253923 | A1 | 12/2004 | Braley et al. |
| 2005/0071427 | A1 | 3/2005 | Dorner et al. |
| 2005/0088997 | A1 | 4/2005 | Melpignano |
| 2005/0198131 | A1 | 9/2005 | Appelman et al. |
| 2005/0211784 | A1 | 9/2005 | Justin |
| 2005/0228876 | A1 | 10/2005 | Malik |
| 2006/0101119 | A1 | 5/2006 | Qureshi et al. |
| 2006/0135064 | A1 | 6/2006 | Cho et al. |
| 2006/0176378 | A1 | 8/2006 | Okamoto |
| 2006/0232437 | A1 | 10/2006 | Gutowski et al. |
| 2006/0265454 | A1 | 11/2006 | Forlenza et al. |
| 2007/0024706 | A1 | 2/2007 | Brannon et al. |
| 2007/0071416 | A1 | 3/2007 | Ikemizu |
| 2007/0263075 | A1 | 11/2007 | Nimri et al. |
| 2008/0034040 | A1 | 2/2008 | Wherry et al. |
| 2008/0055048 | A1 | 3/2008 | Bonneau et al. |
| 2008/0072285 | A1 | 3/2008 | Sankaran et al. |
| 2008/0134295 | A1 | 6/2008 | Bailey et al. |
| 2008/0134343 | A1 | 6/2008 | Pennington et al. |
| 2008/0231716 | A1 | 9/2008 | Anderson |
| 2008/0303903 | A1 | 12/2008 | Bentley et al. |
| 2009/0031381 | A1 | 1/2009 | Cohen et al. |
| 2009/0067846 | A1 | 3/2009 | Yu et al. |
| 2010/0012715 | A1 | 1/2010 | Williams et al. |
| 2012/0140018 | A1 | 6/2012 | Pikin et al. |
| 2013/0120592 | A1* | 5/2013 | Bednarczyk ........... H04N 5/765 348/207.1 |
| 2014/0043493 | A1 | 2/2014 | Bateman et al. |
| 2014/0043495 | A1 | 2/2014 | Bateman et al. |
| 2014/0047143 | A1 | 2/2014 | Bateman et al. |
| 2015/0350342 | A1* | 12/2015 | Thorpe ................... H04L 41/12 709/219 |
| 2016/0294925 | A1* | 10/2016 | Prashant ................. G06F 9/541 |

FOREIGN PATENT DOCUMENTS

| | | |
|---|---|---|
| CN | 101277274 A | 10/2008 |
| DE | 69916277 T2 | 3/2005 |
| DE | 602004008731 T2 | 6/2008 |
| DE | 602004009020 T2 | 6/2008 |
| DE | 102008007085 A1 | 8/2009 |

OTHER PUBLICATIONS

Hirofuchi, et al., "USB/IP—a Peripheral Bus Extension for Device Sharing over IP Network", In the Proceedings of the FREENIX Track: USENIX Annual Technical Conference, Apr. 2005, pp. 47-60.

Hirofuchi, et al., "USB/IP: A Transparent Device Sharing Technology over IP Network", IPSJ Transactions on Advanced Computing Systems, vol. 46, No. SIG11(ACS11), Aug. 2005, pp. 349-361.

CN200810084374.0, "Office Action", dated Sep. 14, 2010.

"USB/IP Project,", USP Request ofve IP Network, http://usbip.sourceforge.net/, Feb. 23, 2011.

U.S. Appl. No. 61/681,981, "U.S. Provisional application", filed Aug. 10, 2012.

U.S. Appl. No. 61/713,429, "U.S. Provisional application", filed Oct. 12, 2012.

U.S. Appl. No. 61/713,440, "U.S. Provisional application", filed Oct. 12, 2012.

U.S. Appl. No. 61/792,082, "U.S. Provisional application", filed Mar. 15, 2013.

U.S. Appl. No. 12/950,426, "Non-Final Office Action", dated May 24, 2013, 20 pages.

U.S. Appl. No. 13/960,202, "U.S. Non-provisional application", filed Aug. 6, 2013.

U.S. Appl. No. 13/960,292, "U.S. Non-provisional application", filed Aug. 6, 2013.

U.S. Appl. No. 13/960,313, "U.S. Non-provisional application", filed Aug. 6, 2013.

DE102011086678.7, "Office Action", dated Sep. 5, 2013, 15 pages.

U.S. Appl. No. 12/950,426, "Final Office Action", dated Oct. 23, 2013, 22 pages.

U.S. Appl. No. 13/960,202, "Non-Final Office Action", dated Feb. 20, 2014, 11 pages.

U.S. Appl. No. 13/960,313, "Non-Final Office Action", dated Mar. 4, 2015, 8 pages.

\* cited by examiner

WIRELESS VIDEO CAMERA AND CONNECTION METHODS INCLUDING MULTIPLE VIDEO OR AUDIO STREAMS

RELATED APPLICATIONS

The application is a divisional application of U.S. patent application Ser. No. 13/960,241 filed Aug. 6, 2013, entitled WIRELESS VIDEO CAMERA AND CONNECTION METHODS INCLUDING MULTIPLE VIDEO OR AUDIO STREAMS, claims the benefit of U.S. Provisional Application No. 61/681,981, entitled WIRELESS VIDEO CAMERA AND CONNECTION METHODS, filed Aug. 10, 2012; U.S. Provisional Application No. 61/713,429, entitled WIRELESS VIDEO CAMERA AND CONNECTION METHODS INCLUDING A USB EMULATION, filed Oct. 12, 2012; and U.S. Provisional Application No. 61/713,440, entitled WIRELESS VIDEO CAMERA AND CONNECTION METHODS INCLUDING MULTIPLE VIDEO STREAMS, filed Oct. 12, 2012, the contents of which are hereby incorporated by reference in their entireties.

BACKGROUND OF THE INVENTION

Embodiments of the present invention generally relate to the management and operation of network cameras and the provision of multiple video streams from a single camera. More particularly, embodiments of the present invention relate to simultaneous sending of multiple video streams to different nodes based on common video capture data, and may be sent at, for example, different bitrates, different resolutions and/or different frame-rates.

Many cameras today provide an interface to produce specific video streams over a network interface, such as over real-time streaming protocol (RTSP) or over HTTP streaming, such as Apple's HTTP Live Streaming, Adobe's HTTP Dynamic Streaming, or Microsoft's HTTP Smooth Streaming. Similarly many of these cameras allow the simultaneous streaming of different versions of a stream. These cameras lack the ability to intelligently interact with online video services and local computers and to optimally use multiple video streams sent to different network destinations for different network purposes.

SUMMARY OF THE INVENTION

According to first aspects of the invention, a method of establishing a streaming video session may include, at a network camera, receiving an instruction to begin video capture from a first network node, including information identifying a second network node; sending a first video stream to the first network node; and simultaneously sending a second video stream to the second network node. In embodiments, the first and second video streams may be based on the same common video capture data, and the first and second video streams may be sent at, at least one of: different bitrates, different resolutions or different frame-rates.

Embodiments may include adjusting a parameter of the second video stream in response to performance data received from at least one of the second network node or another network node.

In some embodiments, the performance data may include at least one of latency, audio quality, video quality, and processor workload.

In some embodiments, adjusting the parameter of the second video stream may include changing at least one of a video resolution, a compression ratio, a compression rate, a frame-rate, and a key-frame interval.

In some embodiments, adjusting the parameter of the second video stream may include selecting the parameter to be adjusted from a plurality of parameters based on at least one of the performance data, an analysis of the first video stream, an analysis of the second video stream.

Embodiments may include adjusting parameters of multiple network cameras sharing a common Internet connection to one or more second network nodes.

Embodiments may include adjusting compression ratios between the first and second video streams based on the performance data.

Embodiments may include receiving information indicating that the quality of an audio stream is below a predetermined threshold, and reducing the bitrate of the second video stream.

In some embodiments, the network camera may be connected to a wireless network, the first network node is a computing device locally connected to the wireless network, and/or the second network node is one of a remote device or service that is in communication with the network camera or the computing device via the Internet.

According to further aspects of the invention, a camera may be provided including an optical sensor; and a processor configured to send a first video stream of a first resolution to a local device; and send a second video stream of a second resolution to a remote device.

In some embodiments, the first stream may be sent wirelessly.

In some embodiments, the second stream may be sent wirelessly.

In some embodiments, the camera may be further configured to wirelessly obtain performance data related to the first or second video streams, and to adjust a parameter of the second video stream in response to the performance data.

In some embodiments, the processor may be configured to send the first and second video streams over a common local area network.

In some embodiments, the first stream may be sent over a wired connection to the local device.

In some embodiments, the processor may be further configured to establish a control channel between the local device and the camera.

In some embodiments, the processor may be further configured to establish a link with a remote website associated with the remote device, and to control video streaming to the remote site via an application running on the camera.

In some embodiments, the processor may be further configured to respond to control signals sent from the local device, and to control the application running on the camera based on the control signals.

In some embodiments, the processor may be further configured to establish a wireless connection between the local device and the camera.

In some embodiments, the first and second resolutions may be different.

According to further aspects of the invention, a method of sharing video data between a camera, a host device and a remote service, may be provided including on or more steps of establishing a first wireless connection between the camera and the host device; establishing a second connection between the host device and the remote service; sending identification information related to the camera from the host device to the remote service; and/or receiving a video stream at the host device from the remote service based on the identification information. In embodiments, the video stream may be communicated from the camera to the remote service without being processed by the host device, and the video stream is communicated from the remote service to the host device without further processing by the camera.

In some embodiments, the first wireless connection may include a control channel for allowing the host device to control the camera.

In some embodiments, the first wireless connection may include a video channel for allowing the host device to receive another video stream from the camera.

In some embodiments, the host device may be at least one of a personal computer, a smart phone or a remote control.

Embodiments may include establishing a plurality of wireless connections between the host device and a plurality of devices including the camera, wherein establishing the plurality of wireless connections includes a protocol negotiation based on one or more of an anticipated power requirements analysis for the plurality of devices, an anticipated usage requirements analysis for the plurality of devices, and anticipated or mandated security requirements associated with the plurality of devices.

In some embodiments, a camera may include an optical sensor; a wireless communication device; and a processor configured to establish a connection with a remote web site, and stream a first video stream to the remote website. The first stream may be sent wirelessly. The processor may be further configured to: establish a connection with a local device, and stream a second video stream to the local device. In some embodiments, the first and second video streams include different resolutions, may be sent using different formats, and/or may include different audio formats. In some embodiments, the second stream may be sent wirelessly.

In some embodiments, the processor may be further configured to establish a control channel between the local device and the camera.

In some embodiments, the camera may be further configured to wirelessly obtain performance data related to the first or second video streams, and to adjust a parameter of the second video stream in response to the performance data.

In some embodiments, the processor may be configured to send the first and second video streams over a common local area network.

In some embodiments, the camera may be further configured to wirelessly obtain performance data related to the first video stream, and to adjust a parameter of the first video stream in response to the performance data.

In some embodiments, the processor may be further configured to control the first video stream via an application running on the camera.

In some embodiments, the processor may be further configured to: establish a connection with a local device, respond to control signals sent from the local device, and control the application running on the camera based on the control signals.

In some embodiments, the processor may be further configured to establish a wireless connection between the local device and the camera.

In some embodiments, the processor may be further configured to: establish a connection with at least one other camera, and stream video from the at least one other camera to the remote website. In some embodiments, the processor may be further configured to: provide control signals to the at least one other camera, and control an application running on the at least one other camera based on the control signals. In some embodiments, the at least one other camera may include a plurality of cameras.

In some embodiments, the processor may be further configured to stream the video from the at least one other camera to the remote website with the first video stream. In some embodiments, the processor may be further configured to stream the video from the at least one other camera to the remote website as a second video stream.

In some embodiments, a camera may include an optical sensor; a wireless communication device; and a processor configured to establish a first connection with a remote location, establish a second connection with at least one other camera, and stream video from the camera and video from the at least one other camera to the remote location. In some embodiments, the remote location is at least one of a remote website, a remote server, and a remote client device.

In some embodiments, the processor may be configured to stream the video from the camera with the video from the at least one other camera to the remote location. In some embodiments, the processor may be configured to combine the video from the camera with the video from the at least one other camera. In some embodiments, the processor may be configured to stream the video from the camera to the remote location as a first video stream and the video from the at least one other camera to the remote location as a second video stream. In some embodiments, the processor may be configured to switch an outgoing video stream between the first video stream and the second video stream.

In some embodiments, the remote location may be a remote website, and the processor may be configured to stream the video from the camera and the video from the at least one other camera to the remote website via a local wireless network connected to the internet.

In some embodiments, the camera connects with the at least one other camera via at least one of, for example, wifi, Bluetooth, and an internet router.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the related technology. No attempt is made to show structural details of technology in more detail than may be necessary for a fundamental understanding of the invention and various ways in which it may be practiced. In the drawings.

DETAILED DESCRIPTION OF THE INVENTION

Figure 1:
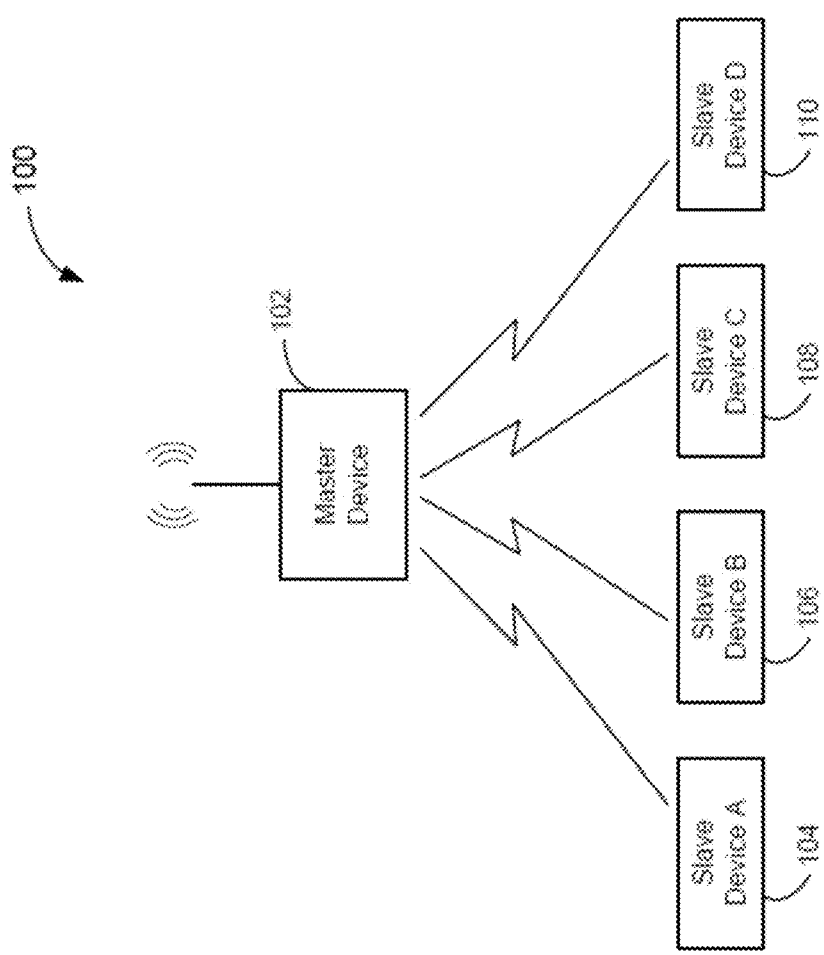
FIG. 1 is an illustrative network topology according to one embodiment of the present invention.

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise. Thus, for example, a reference to "a camera" is a reference to one or more cameras and equivalents thereof known to those skilled in the art.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law.

Embodiments of the present invention generally relate to the management and operation of network cameras and the provision of multiple video streams from a single camera. More particularly, embodiments of the present invention relate to simultaneous sending of multiple video streams to different nodes based on common video capture data, and may be sent at, for example, different bitrates, different resolutions and/or different frame-rates.

Embodiments of the present invention may provide systems and methods for facilitated or automatic connection or pairing of network cameras using machine-readable features, such as machine-readable indicia and audio signals. A first device may acquire a machine-readable feature in order to initiate an automatic device connection or pairing process with a second device (or with a plurality of devices). The device connection or pairing process may be "automatic" in that no additional user intervention or user input may be required to complete the device connection or pairing process. For example, a scanner or camera component associated with a network camera may optically acquire a barcode in order to initiate automatic Bluetooth pairing between the network camera and any number of other Bluetooth devices, such as peripherals. Similarly the network camera can scan a barcode to access a WiFi network and or one or more online services. If more than one network protocol is supported between the first device and the second device, one or more of a power requirements analysis and a usage requirements analysis may be performed. One network protocol of the more than one supported network protocols may be selected for use in establishing a connection between the first device and the second device based, at least in part, on the power requirements analysis, the usage requirements analysis, or both the power requirements analysis and the usage requirements analysis. After the first device and the second device have connected or paired a first time, connection parameters may be stored to one or both devices.

Embodiments of the present invention further provide systems and methods for establishing video streams from a network camera. A network camera may be used for a video call and the camera may receive an indication from a device used to set up the call to send one video stream directly from the camera to a remote computer, and a different video stream back to the computer initiating the call. These streams may be of different quality and formats depending on a number of properties of each terminal of the video call. In an embodiment of the invention, the camera is authenticated with an online video-call service wherein the service directly instructs the camera where to send video data. Embodiments of the present invention further provide systems and methods for optimizing quality and performance of video, audio and other data streams related to network cameras, and means for synchronizing audio and video data received from multiple sources, including multiple network cameras.

An embodiment of the invention includes a network camera that can be used in conjunction with online video services including video conferencing services. The camera may have the ability to capture video using an imaging sensor and encode the video in a number of resolutions and formats. The network camera may also include one or more microphones to capture audio. For example, the camera may have an image sensor with a resolution of 4096 by 1714. In an embodiment of the invention, the camera may stream video in resolutions under 1920 by 1080. The camera may include the ability to encode video in a number of video formats including H.264 (MPEG 4 Layer 10), Motion JPEG (MJPEG), Web M, H.263 and more. The camera may be able to convert video captured using the image sensor to a lower resolution and encode it using one of the supported video formats. Similarly, the camera may be able to encode a section of the captured video as a lower resolution stream, for example the top left corner of a VGA stream may be encoded as a QVGA stream. For example, the camera may encode an H.264 stream at 640 by 480 pixels at 20 frames per second at 1 mbps.

In an embodiment of the invention the network camera sends a single video stream to a single destination. That destination may be the remote party of a video call, a video repository or any other destination. In another embodiment of the invention, the network camera may transmit multiple video streams to one or more destinations at generally the same time. For example, if the network camera is used to facilitate a video call, the camera may send one network stream to the remote party, and one network stream to the local party such that the local party can supervise the outgoing video stream. The stream sent to the remote party may be optimized based on the equipment at the remote party and the network conditions between the network camera and the remote party. For example, only a limited amount of bandwidth may be available between the network camera and the remote party. The camera may dynamically adapt the stream to the remote party to compensate for these conditions, and in some embodiments send video data directly to the remote party, bypassing the local host computer.

In an embodiment of the invention, the camera received feedback from the remote destination regarding latency as well as audio and video quality, processor workload and other variables impacting quality. The network camera may then adjust the properties of the video stream to ensure optimum quality. For example, after receiving notification from the remote party that audio quality is suffering, the network camera may make adjustments to the video stream to reduce the amount of network bandwidth consumed by the video stream to free up capacity for the audio stream. Similar adjustments may be made if the video quality of the call suffers.

In an embodiment of the invention, where multiple network applications and or network cameras share an internet connection, they may coordinate bandwidth usage to optimize the quality of all applications. For example, two users in a household sharing an internet connection may be conducting two video calls using two separate network cameras. In an embodiment of the inventions, the two network cameras may coordinate the bandwidth used for audio and video in order to ensure that both calls do not suffer packet loss and stutter in video or audio.

Bandwidth restrictions may be caused by a number of factors. When sending a video stream from one user to another, there may be a bottleneck at the local network of the sending user, including the wireless network, at the internet connection of the sending user, at the internet connection of the receiving user, or at the local network of the receiving user. Furthermore, network traffic between the two users may be impacted by network performance between the two users internet service providers. When a network camera detects a reduction in perceived video quality, different mitigation measures may be employed depending on what causes the network performance issues.

For example, if the network camera is sending multiple high-bandwidth streams to local users as well as a bandwidth limited stream to a remote user, the capacity of the wireless connection of the camera or the local wireless network may be exhausted, while the capacity of the user's internet connection may still have spare capacity. Reducing the quality of the remote stream may in such a case have little impact on transmission issues perceived at the remote party, and the camera may instead improve transmission by reducing the quality of one or more of the much higher bandwidth local streams to free up capacity in the local wireless network and let the remote stream pass with less latency and packet loss.

When adjusting a video stream to compensate for network performance, the video stream may be adjusted in a number of ways. For example, the network camera may change the video resolution, the compression ratio, the frame-rate, the key-frame interval, the compression rate, the compression quality or other parameters. In an embodiment of the invention, the network camera may analyze the content of the video stream to select the best way to optimize the video. For example, if there is little movement in the video, the camera may reduce the frame-rate, whereas if there is a lot of movement in the video, the network camera may reduce the video resolution.

The network camera may have video encoding capability built in hardware and or video encoding capability implemented in software. In either case, encoding different types of video streams may require a higher or lower portion of the overall encoding capacity of the network camera. For example, encoding a high-resolution, high-bandwidth H.264 stream, requires significantly more processing power than encoding a VGA-resolution MJPEG stream.

In an embodiment of the invention, the camera may dynamically allocate video compression capacity between streams based on how the streams are performing. For example if a remote video-stream is underperforming due to low bandwidth at the remote network, the network camera may reduce the bandwidth required by increasing the compression ratio and the compression quality of the stream by diverting more compression resources to the stream, while diverting compression resources away from a local video stream. The quality of the local video-stream may be compensated by increasing the bandwidth while reducing the compression ratio.

The network camera may include the ability to perform image manipulation on a video stream. For example, when the network camera is sending a video stream to a local party in a video call for them to monitor their own image, the network camera may reflect the image in the stream to make the video-feed resemble a mirror image. This may eliminate the need for the local device to perform this transformation. Similarly, the camera may include other video processing capabilities such as the ability to adjust color levels, contrast and brightness or other video transformations. In an embodiment of the invention, these can be adjusted individually per stream to adapt to the requirements of each party.

In an embodiment of the invention, multiple network cameras may be used to provide different video data for the same target. For example, two wireless network cameras may be placed at different angles to capture an event. In a meeting one camera may be used to capture a wide-angle image of the entire room, while one camera may be used to capture a macro view of the current speaker. More than two cameras are also possible. For such a scenario, the two cameras may synchronize their streams in order to ensure satisfactory performance of both video streams and an accompanying audio stream. The two network cameras may first synchronize their clocks to ensure that they simultaneous frames match up with each other and with the audio stream. Furthermore, the bandwidth of the two streams may be coordinated to ensure smooth delivery of both. For example, a high frame-rate video stream may be selected for the stream capturing the macro-view of the current speaker to ensure that lip movement is represented clearly and in sync with the audio. The wide angle view of the entire room may be shown in a higher resolution to get more detail, but at a lower frame-rate since there is less relative movement in the picture.

In an embodiment of the invention, the video-stream quality is assessed prior to the encoding of every key-frame in the video stream as this is the point in time when a change to the stream may be implemented with the least delay. The assessment may be done at a lower frequency. In a different embodiment, the key-frame interval may be adjusted in response to network events.

In an embodiment of the invention, a network camera may be used to simulate a web-camera attached to a computer via a USB cable or other interface. In an embodiment of the invention a driver is installed on the computer to enable the use of the network camera as a local camera. The implementation of the driver on the computer and the communications interface on the camera may vary depending on the target platform on the computer.

In an embodiment of the invention a driver may simulate a USB device connected to a computer and encapsulate USB commands into internet protocol (IP) packets sent to the network camera. This implementation may minimize the complexity of the computer driver and may permit the driver to rely on existing operating-system support for USB cameras. The network camera may then process the received USB commands as if they were transmitted over a conventional USB connection.

In another embodiment of the invention the driver may be more complex and implement a full interface to the operating system digital video application programming interfaces (APIs). For example a windows driver may interface with the Direct Show framework. This approach may be more flexible in that the interface between the computer and the network camera may be optimized for IP transport and may therefore not be dependent on USB specifications and communications standards. Similarly it may permit a more uniform implementation on the camera. This approach may however require more complex drivers as they to a larger degree must interface with operating-system specific APIs for video.

In one embodiment of the invention a hybrid approach is taken, where custom drivers interfacing directly with the operating system video API, such as direct show is used for some operating systems, and a USB simulation is used for less common ones.

In an embodiment of the invention, a USB simulator may run as a service on the camera that produced one video stream, while allowing the camera to serve other video streams, either as additional simulated directly attached cameras or as network streams.

FIG. 1 is simplified schematic of a network 100 according to one embodiment of the present invention. Network 100 may include any wireless network associated with a WLAN, PAN, or any other wireless network. For example, network 100 may be a Bluetooth wireless network. A user terminal or device supporting the Bluetooth standard may establish a wireless connection with neighboring Bluetooth devices using point-to-point connections. A master-slave arrangement may be used with one master device communicating with up to seven slave devices, for example, in a network group called a piconet.

According to one embodiment, network 100 includes a device 102, which may be the master device, and devices 104, 106, 108, and 110, which may be slave devices in the same piconet as device 102. Device 102 may establish a wireless connection with neighboring devices 104 through 110 by executing an inquiry procedure and a paging procedure. After the inquiry procedure and paging procedure, a user of device 102 may select each of devices 104 through 110 from a menu or list of devices that are in range. Alternatively, an automatic procedure may be initiated by acquiring a machine-readable feature with device 102. In some embodiments, each of devices 102, 104, 106, 108, and 110 may be Bluetooth devices or WiFi devices. The machine-readable feature acquired by device 102 may be used to access connection parameters (e.g., network address information) about one or more of devices 104 through 110. The connection parameters may include information required to establish connections with devices 104 through 110. For example, depending on the protocol used, a network address (e.g., Bluetooth address) for each of devices 104 through 110 may be used to establish connections to devices 104 through 110. Other connection parameters, such as authentication and other security information, may also be included in the connection parameters that are accessed via the machine-readable feature.

For example, Bluetooth includes several security features. Bluetooth implements confidentiality, authentication, and key derivation using custom algorithms based on the SAFER+block cipher. Bluetooth key generation is generally based on a Bluetooth PIN, which must be input into both devices. This procedure might be modified if one of the devices has a fixed PIN (e.g., for headsets or similar devices with a restricted user interfaces). During device connection, an initialization key or a master key is generated, using the E22 key generation algorithm. The E0 stream cipher is used for encrypting packets and is based on a shared cryptographic secret, namely a previously generated link key or master key. Those keys, used for subsequent encryption of data sent via the wireless interface, rely on the Bluetooth PIN, which has been input into one or both devices. The connection parameters accessed via the machine-readable feature acquired by device 102 may include any such PIN values, link keys, and/or master keys.

In some embodiments, device 102 may be, for example, a wireless camera, or smartphone. The device 102 may be configured to establish a first connection with a remote location, such as a remote website, a remote server, and/or a remote client. The first connection may include, for example, a wifi connection to a router, and an internet connection to the remote device. Device 102 may further be configured to establish a second connection with at least one other device 104, 106, 108, and 110, such as a camera, smartphone or other client device, and to stream video from the device 102 and video from the at least one other device to the remote location.

The device 102 may be configured to stream the video from the device 102 with the video from the at least one other device to the remote location. In some embodiments, the device 102 may be configured to combine the video from the device 102 with the video from the at least one other device. In some embodiments, the processor may be configured to stream the video from the device 102 to the remote location as a first video stream and the video from the at least one other device to the remote location as a second video stream. In some embodiments, the device 102 may be configured to switch an outgoing video stream between the first video stream and the second video stream.

In some embodiments, the remote location may be a remote website, and the device 102 may be configured to stream the video from the device 102 and the video from the at least one other device to the remote website via a local wireless network connected to the internet.

By way of further example, the above embodiments may provide, among other objects, multi-camera broadcasting with one camera as a master, that pumps data to, for example, wifi connection over router to upstream servers and/or websites. The master camera connect to other video sources that are slaves. The master camera can also decide to switch and pump the separate or combined video in the same session, as mixed streams, etc., to a server or web site. It should be understood that the protocols described above may also be performed by other mobile devices, and may be used to, for example, send video to video hosting or other websites, to remote storage and access sites, to other people via network addresses, phones, local hotspots etc.

Each wireless connection between device 102 and devices 104 through 110 may include a point-to-point bi-directional or uni-directional link. The wireless connections may be connection-oriented or connectionless. Various error-detection, error-correction, and wireless medium access control (MAC) schemes (e.g., CSMA/CD) may be used. Although device 102 is wirelessly connecting to only four devices 104 through 110 in the example of FIG. 1, device 102 may wirelessly connect to more or fewer devices in network 100 in other embodiments. In addition, the protocols used by device 102 to wirelessly connect to devices 104 through 110 may be the same or different protocols. For example, the 802.11 protocol may be used by device 102 to wirelessly connect to devices 104 and 110 whereas the Bluetooth protocol may be used to wirelessly connect to devices 106 and 108. Some devices in network 100 may support more than one protocol (e.g., 802.11 and Bluetooth).

In some embodiments, device 102 automatically connects to one or more of devices 106 through 110 using a negotiated protocol. As described in more detail with regard to FIG. 7 below, the protocol negotiation may be based on one or more of an anticipated power requirements analysis for the devices, an anticipated usage requirements analysis for the devices, and anticipated or mandated security requirements. For example, some devices may support more than one wireless protocol (e.g., 802.11 and Bluetooth). Depending on the anticipated mobility of the devices, the anticipated applications to be used on the devices, and a power requirements analysis, the most appropriate protocol may be negotiated automatically. In some embodiments, the protocol with the lowest transmit power or range is selected for use unless that protocol is not suitable for the anticipated usage of the devices. In some embodiments, the protocol with the strongest security policy (e.g., encryption or authentication) is selected for use unless that protocol is not suitable for the anticipated usage of the devices. In some embodiments, the protocol with the lowest transmit power or range and the strongest security policy (e.g., encryption or authentication) is selected for use unless that protocol is not suitable for the anticipated usage of the devices.

Figure 2:
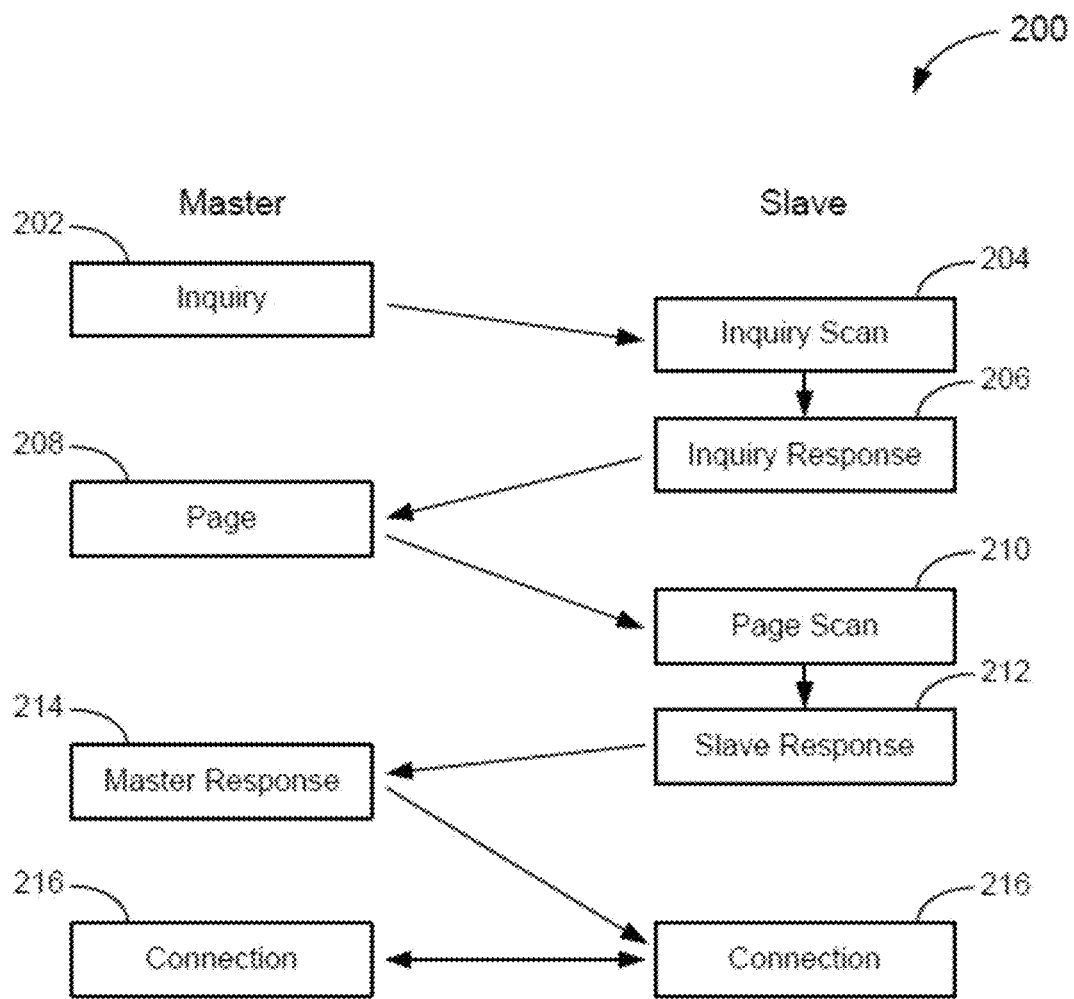
FIG. 2 is an illustrative connection sequence according to one embodiment of the present invention.

FIG. 2 shows an illustrative connection sequence 200 between a first device and one or more other devices according to one embodiment of the present invention. Connection sequence 200 may be used to determine which devices are in range of a device initiating connection sequence 200 and to connect to one or more of these other devices. Normally, a wireless connection (e.g., a Bluetooth connection) between two devices is initiated with an inquiry procedure 202. Inquiry procedure 202 enables the first device to discover other devices that are in range. Inquiry procedure 202 may also determine the addresses and clocks for the other devices that are in range of the first device. During inquiry procedure 202, the first device may transmit inquiry packets and receive inquiry replies. The other devices that receive the inquiry packets may be in an inquiry scan state 204 to receive the inquiry packets transmitted by the first device. The other devices may then enter an inquiry response state 206 and transmit an inquiry reply to the first device. After the inquiry procedure is completed, a connection may be established using a paging procedure 208. Paging procedure 208 typically follows inquiry procedure 202. Although the device address (e.g., Bluetooth address) may be required to establish a connection, some knowledge about the master device's clock (e.g., a clock estimate) may accelerate the setup procedure.

Paging procedure 208 may begin with the first device paging one or more other devices (e.g., slave devices) that are in a page scan state 210. The slave device may transmit a reply to the page to the first device during a slave response state 212. During a master response state 214, the first device may transmit a frequency hopping synchronization (FHS) packet to the other devices. The FHS packet may include the first device's address and clock information. The other devices then send a second reply to the first device in slave response state 212. The first device and the other devices then switch to the first device's channel parameters (e.g., timing and channel frequency hopping sequence) during master response state 214. A connection state 216 starts with a packet with no payload (e.g., a Bluetooth POLL packet) sent by the first device to verify that other devices have switched to the first device's timing and channel frequency hopping sequence. The other devices may respond with any type of packet.

As shown in the example of FIG. 2, a relatively lengthy inquiry procedure and paging procedure are typically used when connecting to devices for the first time. If some connection parameters are known (e.g., a network address), then the inquiry procedure may be bypassed and the paging procedure may be immediately initiated to establish the connection. During the paging procedure, the other device may adapt its native clock to match the first device's clock using a timing offset. In some embodiments, to transmit over the network, at least the channel hopping sequence, the phase of the sequence, and the channel access code may be used.

Figure 3:
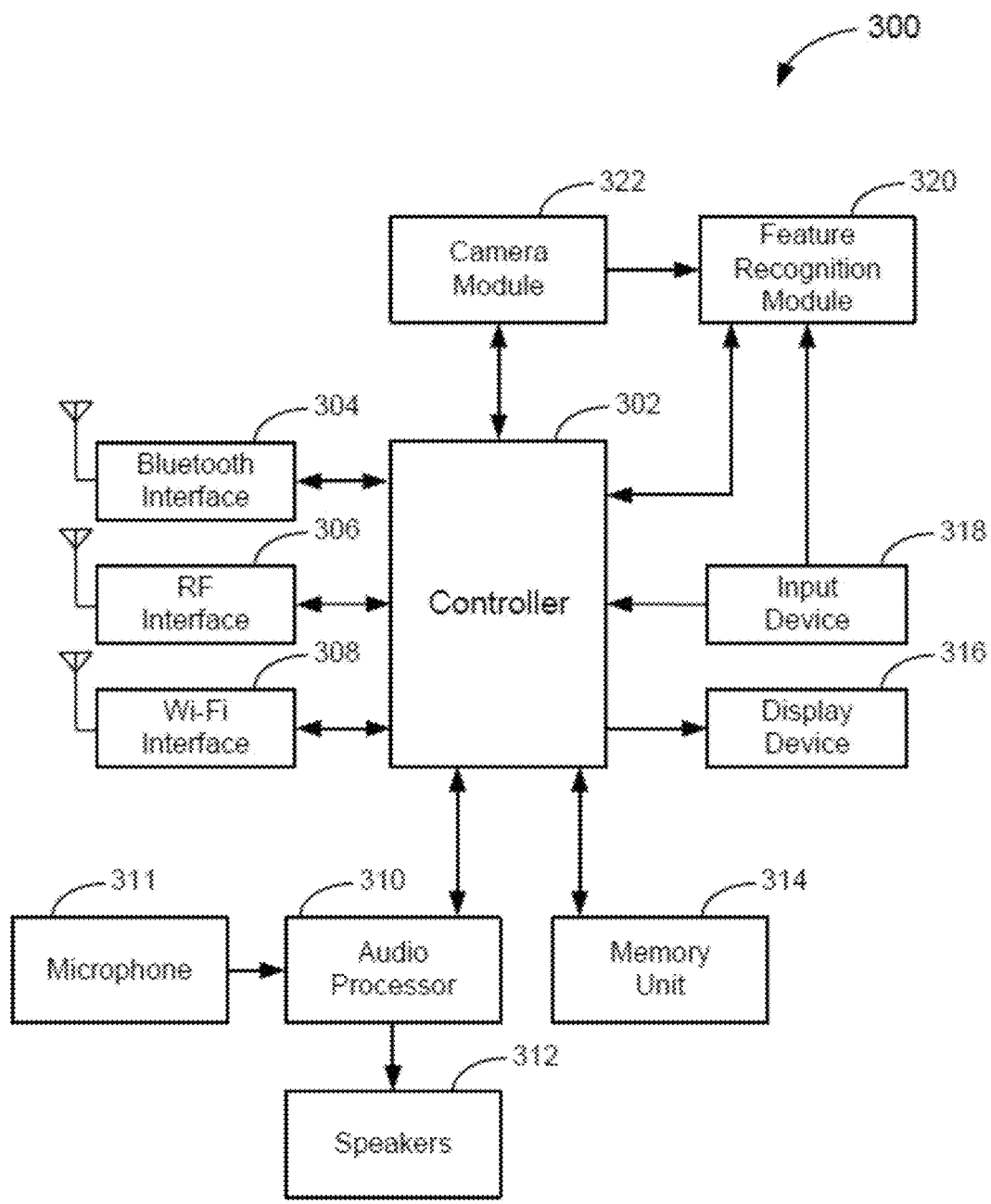
FIG. 3 is a illustrative block diagram of a user device according to one embodiment of the present invention.

FIG. 3 is a block diagram of a device 300 according to one embodiment of the present invention. Device 300 may be any electronic device with a wireless interface, such as a mobile telephone, PDA, or laptop computer, and may be configured to acquire a machine-readable feature and automatically connect to, or pair with, one or more other wireless devices. Device 300 includes a controller 302 that controls the overall operation of device 300. Controller 302 may include one or more processors (e.g., microprocessors) configured to execute machine-readable instructions. A memory unit 314 (e.g., RAM, ROM, hybrid types of memory, storage device, hard drives, optical disc drives, etc.) may store a predetermined program or application for controlling the overall operation of device 300 and store data input and output in memory unit 314.

A camera module 322 may convert an image or a moving picture to a digital form, and controller 302 may store the digital form in memory unit 314. A feature recognition module 320 may be configured to read a machine-readable feature (e.g., a printed or displayed indicia) using camera module 322 or an input device 318. Controller 302 may store feature information in memory unit 314. Input device 318 may also be used to read a feature and may include a scanner (e.g., barcode scanner), RFID reader, magnetic strip reader, keyboard, mouse, or any other type of input device that may be used to read, scan, acquire, or otherwise process a machine-readable feature. A display device 316 may include a Liquid Crystal Display (LCD), CRT display, or plasma display for displaying various information (including, e.g., machine-readable features such as barcodes) and may be controlled by controller 302.

Device 300 may also include one or more wireless interfaces. In the example of FIG. 3, device 300 includes a Bluetooth interface 304, an RF interface 306, and a Wi-Fi interface 308, but more or fewer types of wireless interfaces may be included in device 300 in other embodiments. RF interface 306 may include an RF transceiver to perform wireless communication with a base station and amplify and filter transmitted and received signals to allow an RF signal to be exchanged between controller 302 and the base station.

Bluetooth interface 304 may perform wireless communications with other Bluetooth devices and allows an RF signal to be exchanged between controller 302 and other Bluetooth devices. In particular, Bluetooth interface 304 may broadcast a request message for a connection with one or more Bluetooth devices relating to the connection parameters accessed from optically acquired machine-readable features. Wi-Fi interface 308 may perform wireless communications with other Wi-Fi devices and allow connection parameters to be exchanged between controller 302 and other Wi-Fi (e.g., 802.11) devices.

An audio processor 310, which may include or be connected to one or more of an acoustic coupler, a digital signal processor, and memory, may be configured to output audio signals using speakers 312 and to receive audio signals using a microphone 311. Audio processor 310 may encode an audio signal into a sequence of modulated tones (e.g., using audio frequency-shift keying (AFSK), dual-tone multi-frequency (DTMF) signaling, or some other suitable audio modulation technique). When received by another device, the modulated tones may be decoded and converted into wireless connection parameters (e.g., a Bluetooth address), as described in more detail below. In some embodiments, the modulated tones may include tones of a frequency outside the human hearing range of approximately 20 Hz to 20 kHz. Additionally or alternatively, the modulated tones may be decoded and converted into a unique identifier that is used, for example, as a key for a table in a relational database. The key may be used to lookup wireless connection parameters from the database. In this way, an audio signal may be used to facilitate device connection or device pairing.

In a typical usage scenario, a user of device 300 may activate input device 318, camera module 322, or microphone 311 to acquire a machine-readable feature. For example, a barcode, watermark, image, symbol, or hologram may be optically acquired by a digital camera associated with device 300. As another example, microphone 311 may be used to receive audio signals. In response to acquiring the machine-readable feature, device 300 may execute an automatic connection or pairing procedure with one or more other devices associated with connection parameters accessed via the machine-readable feature. For example, at least some of the connection parameters may be actually encoded and stored in the machine-readable feature. To access the connection parameters, the encoded machine-feature feature may be decoded and converted into a digital representation of the feature. Additionally or alternatively, at least some of the connection parameters may be accessed from a storage device using the machine-readable feature. For example, the machine-readable feature may be decoded and converted into a digital representation. At least part of this digital representation may then be used as, or contain, a key in a table in a relational database that stores the connection parameters. Another part of the digital representation may be used as, or contain, a network address or URL associated with the database (e.g., a URL or network address used to access the database). The relational database may be stored locally on device 300 or on a network storage device. As yet another example, the machine-readable feature may be decoded to a network address or URL of a storage device (e.g., a network storage device) that stores the connection parameters.

Figure 4B:
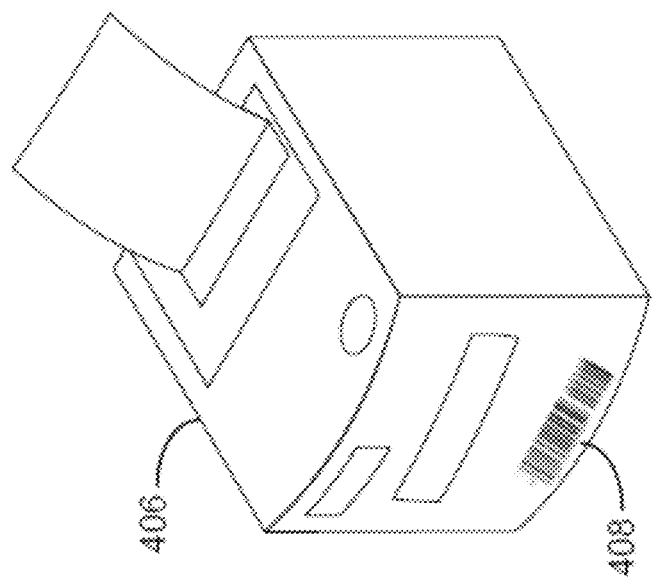
FIGS. 4A and 4B are illustrative machine-readable features according to various embodiments of the present invention.
Figure 4A:
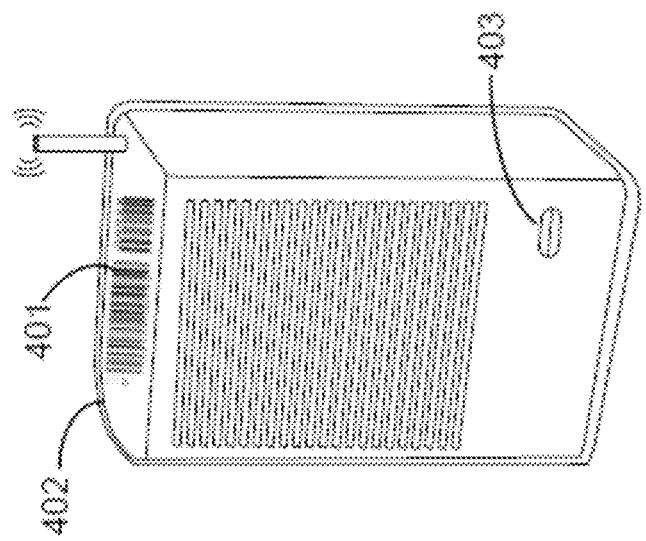

FIGS. 4A and 4B show some illustrative devices and the device's associated machine-readable features. FIG. 4A shows a wireless speaker system 402 with a machine-readable feature 404. In the example of FIG. 4A, machine-readable feature 404 may take the form of a miniature display with, for example, a linear barcode; however, any other machine-readable feature (e.g., magnetic strip, RFID tag, matrix barcode, or encoded image) may be associated with wireless speaker system 402 in other embodiments. A device that wishes to connect to or pair with wireless speaker system 402 may scan, optically acquire, or read machine-readable feature 404 using a camera, barcode scanner, or magnetic strip reader integrated with or attached to the device. Because wireless speaker system 402 includes audio support, in some embodiments, button 403 of wireless speaker system 402 may be used to initiate an automatic pairing process using audio signals. For example, when a user presses a button 403 of wireless speaker system 402, it may cause an audio controller within wireless speaker system 402 to produce a series of modulated tones (e.g., using audio frequency-shift keying (AFSK), dual-tone multi-frequency (DTMF) signaling, or some other suitable audio modulation technique). The modulated tones, when received by a microphone or sound recording device of a device (e.g., microphone 311 of device 300 (FIG. 3)), may be converted into a spectrogram and a time-frequency analysis may be performed on the spectrogram. The spectrogram may be used as a fingerprint for a unique key that is used to lookup connection parameters (e.g., Bluetooth address and security parameters) in a database. Alternatively, the time-frequency analysis may be used to derive connection parameters directly from the spectrogram. For example, in one embodiment, an audio converter is used to convert aspects of the received audio signals (e.g., frequencies of peak intensity) into raw PCM data which is then converted into binary data. This digital representation of the audio signal may include at least some of the connection parameters used to automatically connect to one or more other devices.

FIG. 4B shows a device 410 with an integrated display 412. Integrated display 412 may include any type of display, including CRT, LCD, or plasma display. Integrated display 412 may be part of a larger device, such as a remote control, a mobile telephone, laptop computer, printer, scanner, or any other electronic device with wireless network functionality. A processor within device 410 may cause integrated display 412 to display a machine-readable feature 408, which in the example of FIG. 4B takes the form of a linear barcode, or QR code. Machine-readable feature 408 may be static, dynamic (e.g., change over time), and may be configured by a user of device 410. For example, as discussed in more detail below, some machine-readable features are used to access other network devices, wireless networks, remote services, system clock and other synchronization information. Certain synchronization information may help speed up the connection setup process in various ways by providing necessary and/or advantageous information, e.g. a known-valid estimate of the system clock, the clock's phase, and other synchronization information may be included in machine-readable feature 408. In this way, some messages (or exchanges of messages) may be bypassed saving valuable connection and setup time. In some embodiments, machine-readable feature 408 may be updated (e.g., re-encoded and displayed) continuously to reflect changes in system clock and synchronization information. If device 410 is to be used as the master device in a master-slave protocol that adopts the master's clock as the system clock, then machine-readable feature 408 may include an indication of device's 410 own clock (as well as related phase offset information). Other information included in machine-readable feature 408 which may change over time includes encryption keys, PIN values, usage requirements, power requirements, current battery levels, device addresses, and other suitable user settings and options.

Figure 5:
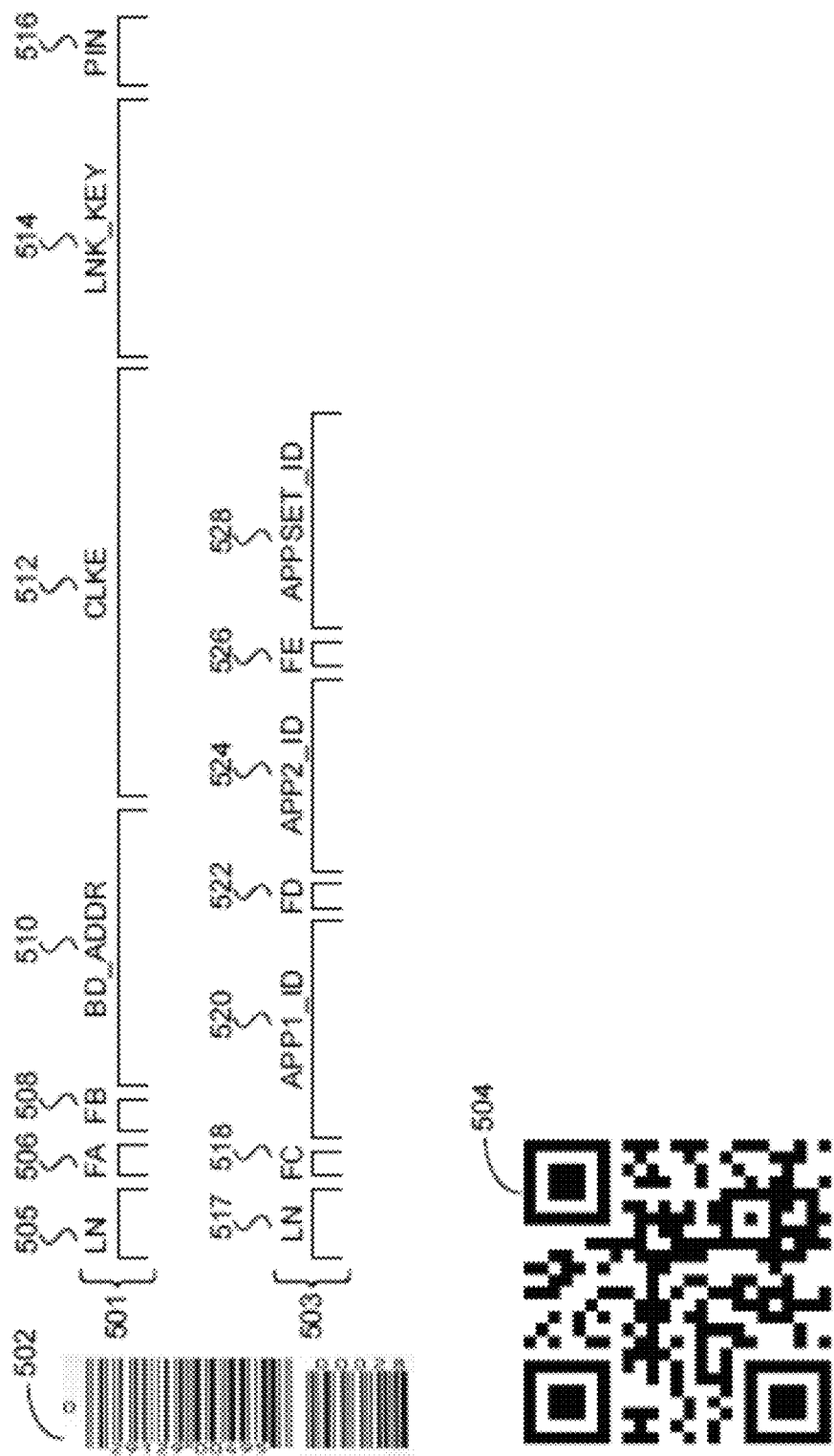
FIG. 5 is an illustrative connection parameter format according to one embodiment of the present invention.

FIG. 5 shows illustrative connection parameter formats according to one embodiment of the present invention. As described above, machine-readable features used for device connection or device pairing may take the form of many different indicia and features. For example, a linear barcode 502, a QR code 504, or both, may both be used to facilitate device connection or device pairing in accordance with the present invention. Other types of machine-readable features may include, for example, characters, symbols, labels, pictorial icons, graphics, images, watermarks, holograms, or any other printed or displayed indicia that may be used to encode, represent, or lookup information. Machine-readable features may also include non-printed features, such as magnetic strips, audio signals, radio frequency identification (RFID) tags, and various other types of sensors and tags embedded or attached to electronic devices and audio signals.

When a device acquires or reads a machine-readable feature, such as linear barcode 502 or QR code 504, the feature may be decoded into a binary string of a particular format or formats. For example, format 501 and 503 may be used to support an automatic device connection or pairing process. Format 501 may include at least a length field 505, a mode flag 506, a security flag 508, an address field 510, a clock field 512, a link key field 514, and a PIN field 516. Length field 505 may include an indication of the length of format 501. Mode flag 506 may indicate whether or not negotiated protocols should be used (for example, if more than one protocol (e.g., Wi-Fi and Bluetooth) is supported). Security flag 508 may indicate whether or not a security mode is required for the connection. Address field 510 may include a network address (e.g., Bluetooth address) of the device. Address field 510 may include a prefix to indicate what type of address (e.g., corresponding to which protocol or standard) is included in address field 510. For example, various network addresses (e.g., MAC addresses, BSSIDs, SSIDs, Bluetooth addresses, IP addresses, etc.) may be supported. The prefix may be used to help identify the type of address as well as protocols or standards supported by the device. Clock field 512 may include various synchronization information (e.g., the device's real-time clock, an estimate of the system clock, or a phase offset). Link key field 514 may include one or more encryption keys (e.g., link keys, session keys, or authentication keys), signed certificates, or other security information. Finally, PIN field 516 may include the PIN or access code associated with the connection.

Embodiments of the invention include a network camera capable of connecting to a wireless network. The network camera may be capable of connecting to one or more online services for providing audio, video and imaging services. For example, the camera may connect directly to an online video site to upload video data, or an online image repository to upload images. The camera may also connect to an online video conferencing service to provide audio or video data in conjunction with video calls. Authentication information for one of more such services may be contained in a machine-readable feature as described above along with information to connect to one or more wireless networks. Such information may include an identifier of the network service and credentials to sign into the network service, such as a username and password. When the device authenticated with the online service, the device may negotiate an authentication token that is independent from the user's credentials such that the credentials may change without impacting the camera's access to the service. Furthermore the credentials stored in the machine-readable identifier may be a one-time token or password usable by the camera to authenticate with the service, such that a discarded identifier cannot be used to authenticate a subsequent device with the service.

Format 501 may be used to initiate a connection to one or more devices identified in address field 510. In some embodiments, more than one address field (as well as other related fields) may be included in format 501 to support connections to more than one device. For example, a laptop computer may access a single machine-readable feature to connect to a plurality of devices and peripherals. In this way, any generic device that has not connected to that plurality of devices and peripherals previously may easily initiate automatic connections with the plurality of devices and peripherals using a single read of a machine-readable feature.

As described above, in some embodiments, machine-readable features may also be used to determine the applications supported or required by a device (or by a connection with the device). Format 503 may be used to indicate such applications and may include a length field 517, type fields 518, 522, and 526, and application identifier fields 520, 524, and 528. For example, some piece of software or code may be necessary to enable or configure communication with the device. This software or code may include, for example, a device driver, an operating system update, a communication utility, an antivirus program, or any other application that may be required to connect to the device. Some of the applications identified in format 503 may be actually required to interface with the device or some service running on the device. Other applications may be mandated by a policy (e.g., a security policy) in force on the device. Length field 517 may include an indication of the length of format 503.

Type fields 518, 522, and 526 may be used to determine whether the application is supported or required. Supported applications may be used to indicate what applications and services are available on the device. Required applications may include a basic set of applications necessary for successful interaction with the device. Before a first device is permitted to connect to another device, a determination may be made by other device that the first device has all required applications installed and that these applications are currently running. If a device attempts to connect without a required application or applications installed, the connection attempt may be automatically terminated and an error reported.

In addition, the type field may be used to indicated whether or not an application should be automatically accessed, downloaded, or transferred ("auto-dl" type) to the device on or after requesting a connection. For example, a device driver (or other piece of software) necessary for communication with the device or online service may be automatically downloaded to the connecting device. In such cases, the application identifier field may include a URL or link to the driver or other piece of software. After decoding the machine-readable feature, a device may automatically download applications marked with the "auto-dl" type if the device does not already have the applications installed. Application identifier fields 520, 524, and 528 may each include a unique application identifier or signature used to identify the application. Although only three applications are identified in the example of FIG. 5, more or fewer applications may be included in format 503 in other embodiments.

Figure 6:
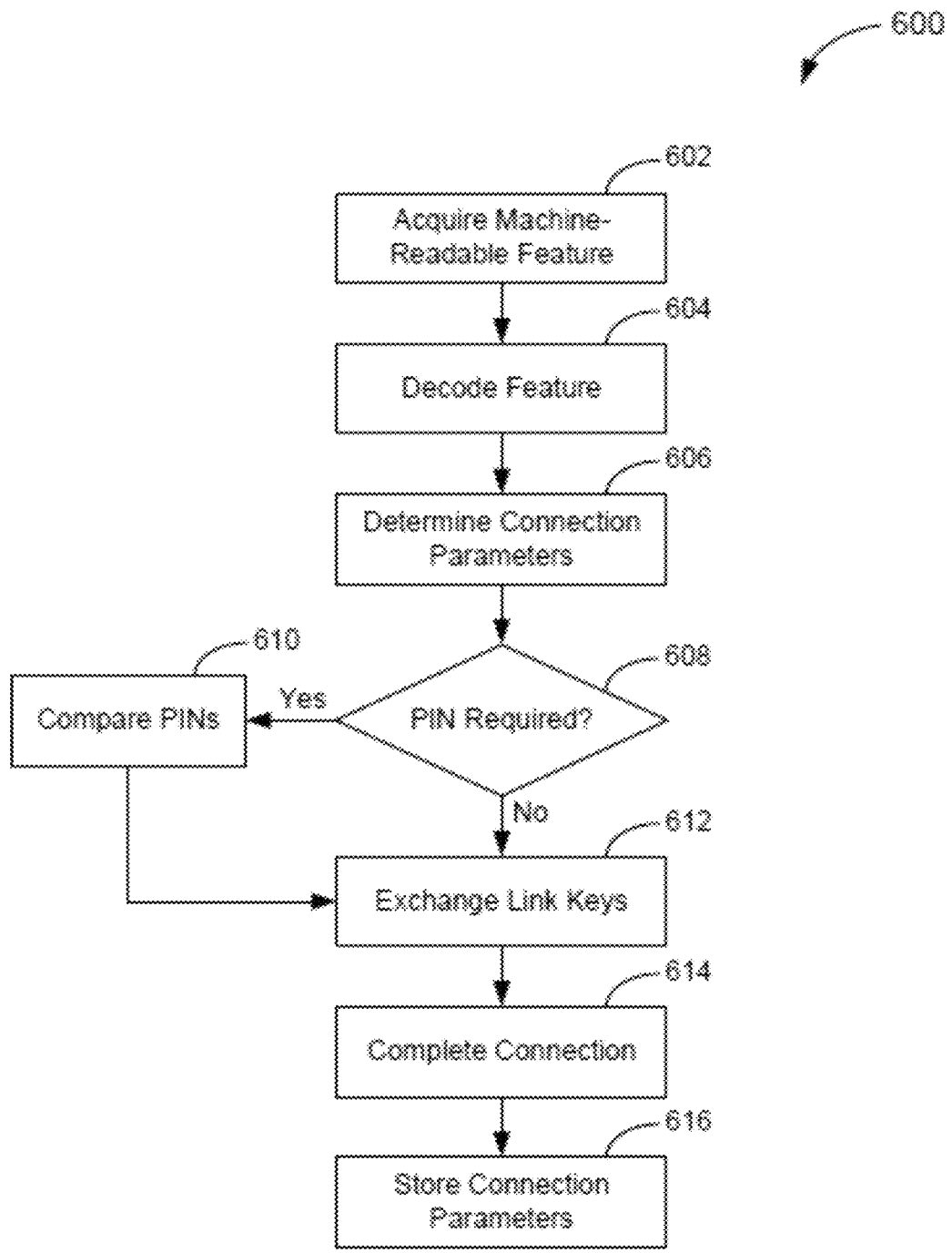
FIGS. 6, 7, and 8 are illustrative processes for supporting automatic device connection or device pairing according to various embodiments of the present invention.
Figure 7:
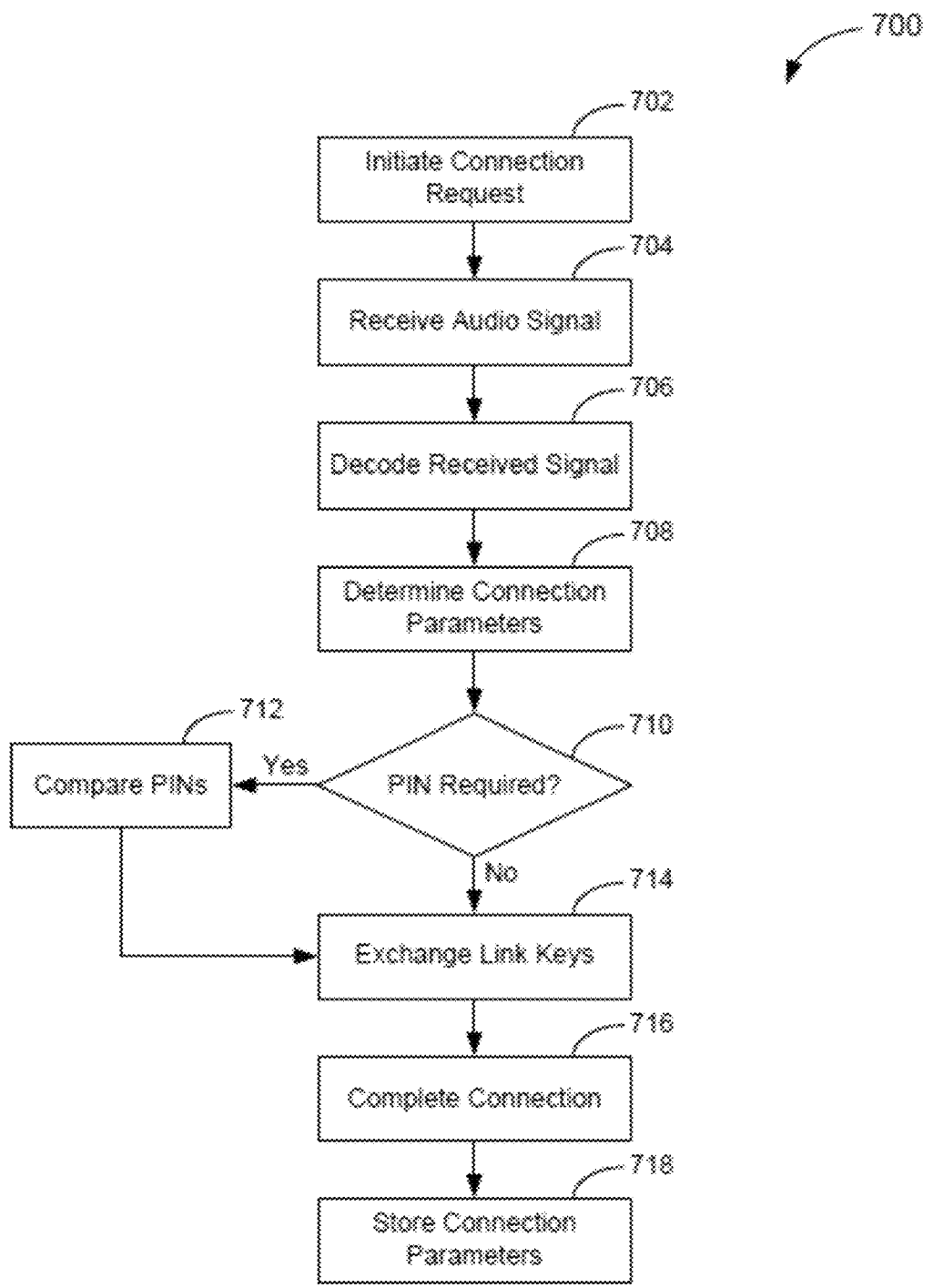
Figure 8:
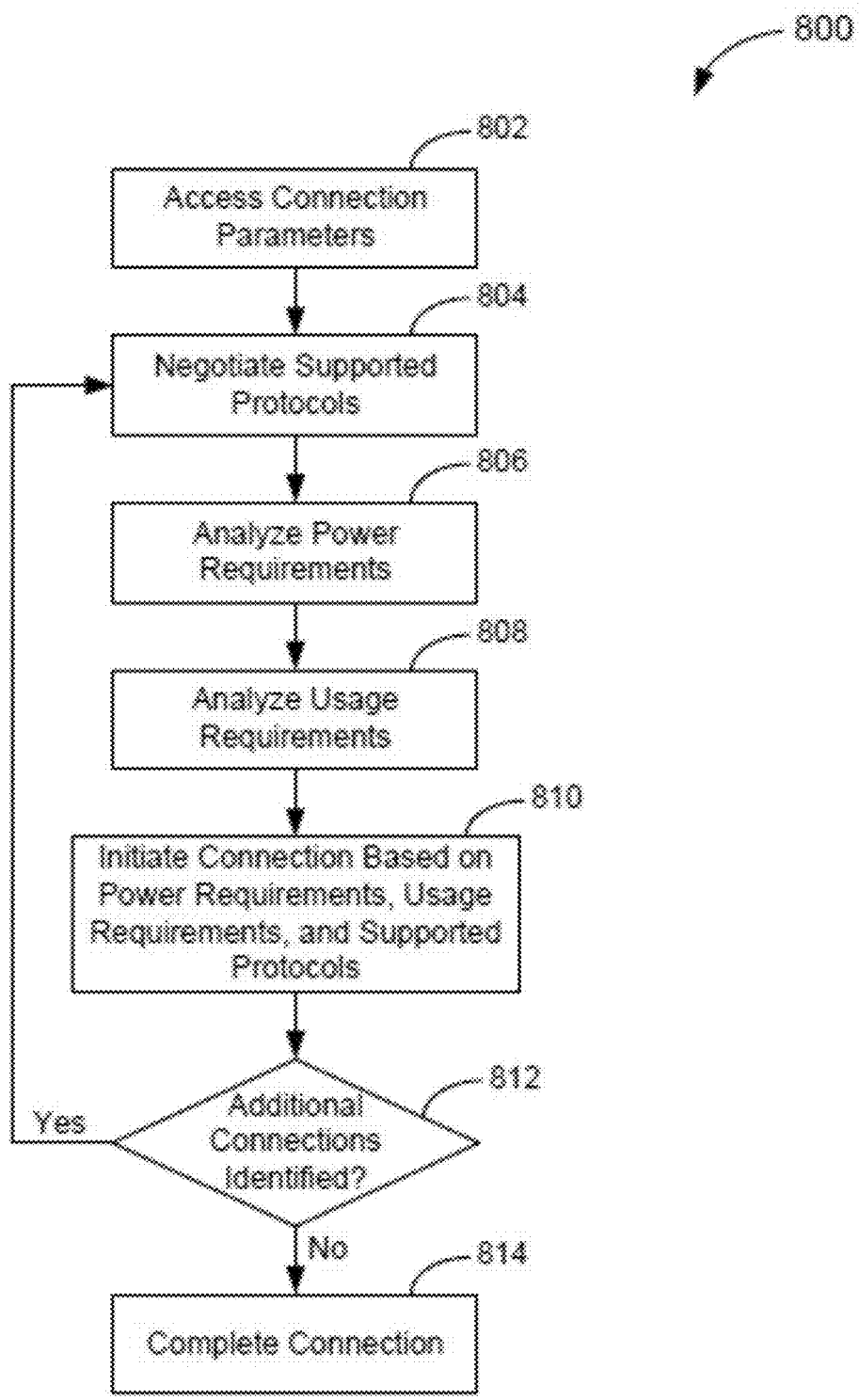

FIGS. 6, 7, and 8 show illustrative processes for supporting the facilitated device connection or device pairing of the present invention. FIG. 6 shows an illustrative process 600 for automatically connecting to an AP or device using a machine-readable feature according to one embodiment of the present invention. At step 602, the machine-readable feature is acquired by a device. For example, camera module 322 (FIG. 3) or input device 318 (FIG. 3) may be used to acquire an image. As another example, a barcode, magnetic strip, or RFID tag may be read at step 602. In some embodiments, an application or computer program running a user's device instructs the user to point to a camera or other input device of the user's device at another device to which the user wishes to connect. The application or program then scans a surface or packaging of the device to which the user wishes to connect and locates the machine-readable feature in order to acquire the feature. After the machine-readable feature is acquired at step 602, one or more of the remaining steps of process 600 may be executed or completed automatically without any intervention from a user. At step 604, the feature may be decoded. Controller 302 (FIG. 3) may decode the encoded machine-readable feature into its raw data (e.g., binary) form. For example, the machine-readable feature may be a barcode and the raw form may included one or more of formats 501 and 503 (both of FIG. 5).

In some embodiments, the machine-readable feature may include a watermark or hidden embedded feature (such as a hidden digital image). This watermark or hidden embedded feature may not be visible or noticeable to the human eye, but it is after acquired using a digital camera, scanner, or other input device it may be isolated and decoded into connection parameters, a unique key used to lookup connection parameters, or both. Various image processing algorithms and techniques may be used to decode the machine-readable feature, including pattern reorganization, character recognition, feature extraction, and dimension reduction.

At step 605, a determination is made whether a PIN (or other access code) is required for the connection. For example, for the Bluetooth protocol, three security modes are defined in the Bluetooth Generic Access Profile (GAP). Security mode 1 is a non-secure mode in which a Bluetooth device does not initiate any security procedures. In security mode 1, both authentication and encryption may be bypassed. Security mode 2 is a service-level enforced security mode in which access to services and devices are controlled. Various security policies and trust levels are defined for simultaneously running applications and services having varying security requirements to permit access to an authorized part of the entire set of device services. Security mode 3 is a link-level enforced security mode in which authentication and encryption are provided based on link keys shared between Bluetooth devices. An essential difference between security mode 2 and security mode 3 is that in security mode 2 the Bluetooth devices initiate security procedures after the channel is established (at the higher layers), while in security mode 3 the Bluetooth devices initiate security procedures before the channel is established (at the lower layers). Two possibilities exist for a device's access to services depending on the devices trust status. A "trusted" device has unrestricted access to all services. An "untrusted" device doesn't have fixed relationships and its access to services is limited. For services, three security levels are defined: services that require authorization and authentication, services that require authentication only, and services that are open to all devices.

In the Bluetooth pairing procedure, for example, a master device may ask for PIN input from a user of the master device. After a connection is attempted after input of the PIN code, a user of a slave device may also be prompted to input a PIN. If the user of the slave device inputs a PIN code that is the same as that input by the user of the master device, the master device and the slave device may exchange link keys assigned according to the input PIN codes, Bluetooth device addresses (BD_ADDR), and random numbers (RAND). The link keys are provided to the master device and slave device to be used in authentication between the master and slave device.

After a new connection between Bluetooth devices is established, a common link key assigned according to a PIN code may be used between the Bluetooth devices for authentication. If an available common link key does not already exist on the Bluetooth devices, a link manager may automatically perform an initialization procedure to exchange link keys. If a determination is made by the master device or the slave device that a PIN is required for the connection, then at step 610 the master device or the slave device may compare the PIN of the other device to its own PIN. After a successful comparison at step 610, or if PIN values are not required to be exchanged, at step 612 link keys may be exchanged between the master device and the slave device. As discussed above, link keys are provided to the master device and the slave device to be used in authentication between the master device and the slave device. At step 614, the connection between the master device and the slave device may be completed and maintained until released by a user at the master device or a user at the slave device. At step 616, one or more connection parameters (e.g., one or more of the parameters defined in formats 501 and 503 (both of FIG. 5)) may then be stored to the master device, the slave device, or both devices. For example, these connection parameters may be used in subsequent connections by the same devices in order to reduce setup and connection time.

In practice, one or more steps shown in process 600 may be combined with other steps, performed in any suitable order, performed in parallel (e.g., simultaneously or substantially simultaneously), or removed.

FIG. 7 shows illustrative process 700 for processing an audio signal used to facilitate connection or pairing between devices according to one embodiment of the present invention. At step 700, a user may initiate a connection request. For example, a user may press button 403 (FIG. 4) of a wireless speaker or audio system. Initiating a connection request may cause an audio controller within a wireless audio system to produce a series of modulated tones (e.g., using audio frequency-shift keying (AFSK), dual-tone multi-frequency (DTMF) signaling, or some other suitable audio modulation technique). In some embodiments, the modulated tones may include tones of a frequency outside the human hearing range of approximately 20 Hz to 20 kHz. The modulated tones are received by a device at step 704 by, for example, a microphone of the device (e.g., microphone 311 of FIG. 3). After the audio signal is received at step 704, one or more of the remaining steps of process 700 may be executed or completed automatically without any intervention from a user. For example, the received audio signal may be decoded and analyzed automatically in response to receiving the audio signal at step 706. In some embodiments, the audio signal may be converted into a spectrogram and a time-frequency analysis may be performed on the spectrogram. Other suitable audio processing, such as filtering, equalization, echo-cancellation, and reverberation-cancellation, may also be performed at step 706. At step 706, a digital representation of the received audio signal may be created and stored. The digital representation may express the pressure wave-form as a sequence of symbols, for example, binary numbers. This digital representation may then be processed using digital circuits, such as audio processor 310 (FIG. 3), controller 302 (FIG. 3), and digital signal processors.

At step 708, connection parameters are determined from the digital representation of the received audio signal. For example, the digital representation may take the form or one or more of formats 501 and 503 (both of FIG. 5). Connection parameters may include one or more addresses (e.g., Bluetooth addresses, MAC addresses, IP addresses, BSSIDs, etc.), one or more clock estimates, other synchronization information, and security information (e.g., various link keys, signed certificates, PIN values, etc.) used in the connection process. At step 710, a determination is made whether a PIN (or other access code) is required for the connection. If a determination is made that a PIN is required for the connection, then at step 712 a comparison of the slave device's PIN and the master device's PIN may be made. After a successful comparison at step 712, or if PIN values are not required to be exchanged, at step 714 link keys may be exchanged. As discussed above, link keys are provided to the master device and the slave device to be used in authentication between the master device and the slave device. At step 716, the connection may be completed and maintained until released by a user at the master device or a user at the slave device. At step 718, one or more connection parameters (e.g., one or more of the parameters defined in formats 501 and 503 (both of FIG. 5)) may then be stored to the master device, the slave device, or both devices. For example, these connection parameters may be used in subsequent connections by the same devices in order to reduce setup and connection time.

In practice, one or more steps shown in process 700 may be combined with other steps, performed in any suitable order, performed in parallel (e.g., simultaneously or substantially simultaneously), or removed.

FIG. 8 shows illustrative process 800 for negotiating connection protocols according to one embodiment of the present invention. As described above, often times two or more devices may support more than one wireless standard or protocol. For example, two devices may support connections using more than one of 802.11, Bluetooth, IrDA, UWB, Z-Wave®, ZigBee®, ANT™, and Bluetooth Low Energy (also known as Bluetooth 4.0). Each of these connection types may be associated with a transmit power specification (e.g., a minimum transmit power) and range. Using a protocol with a higher than needed transmit power may reduce battery life for a mobile device. Using a protocol with a longer than needed range may increase interference with other devices using the same or different protocol. As such, in some embodiments, when facilitated (e.g., automatic) wireless connections are desired, a protocol negotiation technique may be used to increase battery life of one or more of the devices, to decrease interference with neighboring wireless networks, or both.

Depending on the anticipated mobility of the devices, the anticipated applications to be used on the devices, and a power requirements analysis, the most appropriate protocol may be negotiated automatically. In some embodiments, the protocol with the lowest transmit power or range is selected for use unless that protocol is not suitable for the anticipated usage of the devices. In some embodiments, the protocol with the strongest security policy (e.g., encryption or authentication) is selected for use unless that protocol is not suitable for the anticipated usage of the devices. In some embodiments, the protocol with the lowest transmit power or range and the strongest security policy (e.g., encryption or authentication) is selected for use unless that protocol is not suitable for the anticipated usage of the devices.

At step 802, connection parameters may be accessed. For example, a machine-readable feature may be acquired as described in process 600 (FIG. 6) or an audio signal may be received as described in process 700 (FIG. 7). At step 804, supported protocols may be negotiated between the devices wishing to connect. For example, a supported protocol "query" packet may be exchanged between the devices. Alternatively, supported protocols may be derived directly from the accessed connection parameters. As described above, address field 510 (FIG. 5) may include a network address (e.g., Bluetooth address) of the device. Address field 510 (FIG. 5) may also include a prefix to indicate what type of address (e.g., corresponding to which protocol or standard) is included in the address field. In some embodiments, this address prefix is used to determine which protocols or standards are supported by the device.

At step 806, the power requirements of the devices may be analyzed. For example, both devices may be on AC power, one device may be on AC power and one device may be on battery power, or both devices may be on battery power. Battery life remaining levels may also be accessed at step 806. For example, a device may send an indication of the device's remaining battery power to another device during the connection process. Alternatively, battery life levels and power requirements may be included in the machine-readable feature, if dynamic machine-readable features are used. In this way, a device may read power requirements of another device directly from a machine-readable feature.

At step 808, anticipated usage requirements may be analyzed. For example, devices may require only intermittent communication with certain devices (e.g., some peripherals such as printers) or more constant communication (e.g., some peripherals such as input devices and APs). Usage requirements may also include anticipated usage range. For example, PANs including Bluetooth devices are associated with a more limited range than WLAN devices, such as 802.11 devices. At step 808, an indication of the anticipated range may be communicated from the device initiating the connection to another device to which the connecting device wishes to connect. Depending on the anticipated range, certain protocols may not be suitable for the facilitated connection. At step 810, a connection may be initiated based at least in part on the power requirements analysis, the anticipated usage requirements, and the supported protocols of the devices.

If the anticipated usage requirements (e.g., range) is unsuitable for a PAN connection, then PAN connection types may be eliminated from consideration (or assigned a lower priority). If the analyzed power requirements indicate that one or more devices is on battery power, then higher transmit power protocols may be eliminated from consideration (or assigned a lower priority). If both devices are on battery power, then an even lower priority may be assigned to higher transmit power protocols.

At step 810, the connection type with the highest priority may be attempted first and then all remaining connection types may be attempted in priority order until a valid connection is created. Priorities may be weighted based on user preferences and user-configurable. In this way, the most appropriate protocol given the power requirements of the devices and the anticipated usage requirements of the devices may be selected for a connection.

At step 812, a determination may be made if additional connections are to be initiated. For example, as described above, a device may wish to connect automatically to a plurality of peripherals and other devices by accessing a single machine-readable feature. If additional connections are desired, then process 800 may return to step 804 to negotiate supported protocols with another device. If no additional connections are desired, the connection completes at step 812 and is maintained until the connection is released by one of the connected devices.

An embodiment of the present invention may include a computing device having a network interface and a processor. The network interface may be connected to a computer network to which a network camera is also connected. The computer network may be a wireless network, a wired network, or a network with both wireless and wired access. For example, the network camera may be connected to the computer network wirelessly via WiFi, and the computing device may be connected to the computer network via an Ethernet cable.

Figure 9:
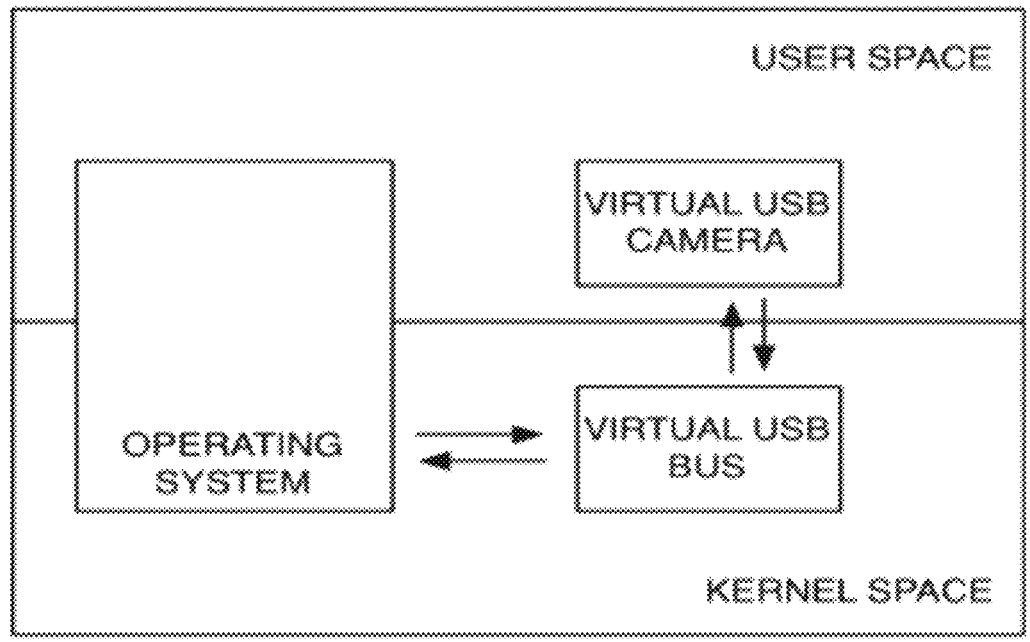
FIG. 9 shows an embodiment of the invention where the virtual USB camera is implemented as a component running in user space sending USB commands to a virtual USB bus running in kernel space.
Figure 10:
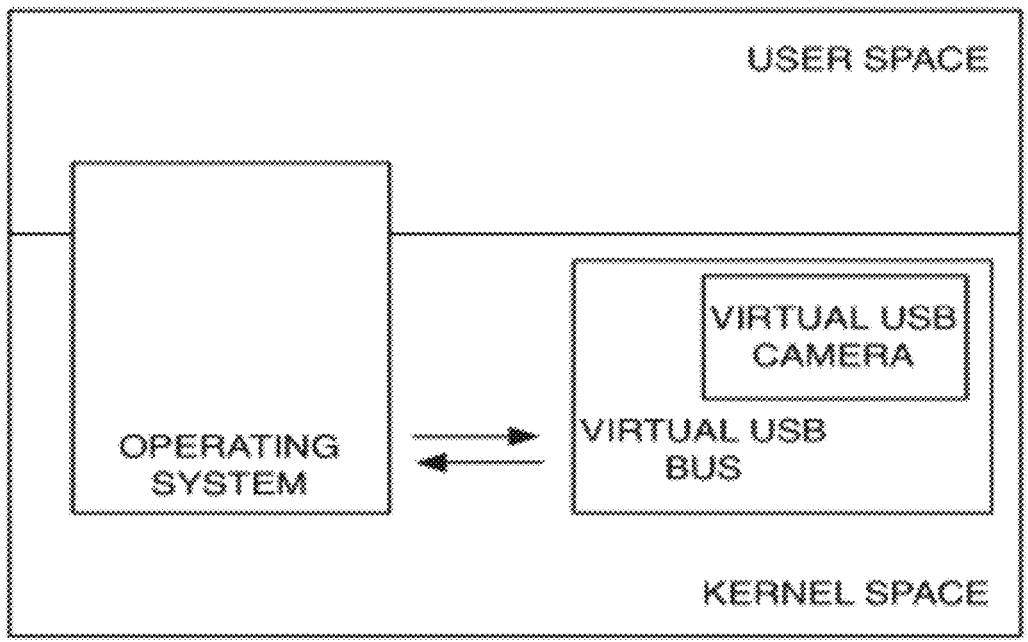
FIG. 10 shows an embodiment of the invention where a single component running in kernel space implements a virtual USB camera and a virtual USB bus to which the camera is connected.

In embodiments of the invention, the network camera may be made available to applications running on the computing device as a Universal Serial Bus (USB) camera connected directly to the computing device. Examples of such embodiments are shown in FIGS. 9 and 10, and discussed further below. USB cameras are common, and a number of computer operating systems, including Microsoft Windows, Mac OS X and Linux include drivers and support for USB cameras without requiring additional software and drivers. Furthermore, many operating systems include application programming interfaces (APIs) that enable third party applications to access video from USB cameras. In embodiments of this invention, by making the network camera available to the operating system as a USB camera, it may be accessed by third party applications implementing these APIs without modification.

USB was designed as a means of sending data between a computer and a peripheral device for that computer. USB can be used to connect a number of devices to a computer, including but not limited to keyboards, mice, webcams, and storage devices. The specification for implementing USB is maintained and from time to time updated by the USB Implementers Forum. The USB 1.1, USB 2.0 and 3.0 Specifications as published by the USB Implementers Forum is hereby incorporated by reference in their entirety.

While initially designed to allow communication between a computer (host) and a peripheral device, USB has since been used to communicate between two computers, or two devices. For example, USB can be used to connect an external camera to a telephone such as an Apple iPhone, or a Motorola Droid telephone. A computer or device may implement one or more USB buses to which devices can be connected. Each USB bus has only one host, which may be a computer as described above. An operating system on the host may control the bus or have the ability to communicate with devices connected to the bus. Devices connected to the USB bus may be assigned a unique seven-bit identifier to allow the operating system to uniquely identify the device. This may allow up to 127 devices to be connected to the bus. A device may have more than one bus. In such a case, up to 127 devices may be connected to each bus.

The host may communicate with any device on the bus by sending a packet and waiting for a response. Only one device on the bus may communicate at any one time. The packets may be of different types, including but not limited to: a token packet, a special packet, a handshake packet, and a data packet. A USB device may have one or more logical endpoints, which can be used to communicate with the host. Communications between a host and an endpoint at a device may be described as a pipe. The USB Specification described a number of different parameters for a pipe and relevant commands. For example, a pipe may have assigned a certain amount of bandwidth. A stream pipe may be used to send any type of data. A stream pipe may be used to conduct a bulk transfer, an isochronous transfer and an interrupt transfer. A stream pipe may be controlled by the host or the device. A message pipe may be used for host controlled communication, and it may allow bi-directional communication where the device may respond to a request from the host.

A USB host or USB controller may be a physical computer with a physical USB port connected to a physical USB bus. For example a computer with a physical USB webcam connected to it. A USB controller and host may also be virtual. For example VMWare Fusion allows a virtualized computer to run on a Macintosh computer. The virtualized computer may have a virtual USB controller and USB bus, wherein the virtualized computer is the host on the bus. VMWare Fusion may represent to the virtualized computer that certain USB devices are connected to the virtual USB bus. These devices may be physical USB devices connected to the Macintosh computer, such as a webcam, or virtual devices such as a keyboard or mouse. The various USB devices may be represented to the virtual computer as connected to the same USB bus even though some of them may be connected to different physical USB busses and some of them may be entirely virtual. For example, a printer may be connected to the Macintosh on a first physical USB bus as device number "1" and a webcam may be connected to the Macintosh on a second physical USB bus as device number 1. In order to represent these devices as connected to the same bus on the virtual computer, VMWare must translate the device IDs such that there are no two identical IDs on the bus, and ensure that USB packets are only transmitted on the virtual USB bus as permitted by the USB specification and as expected by the operating system running on the virtual computer.

FIG. 9 shows an embodiment of the invention where a virtual USB bus is implemented as a component running in kernel space of the operating system giving it broad access to system-level memory space and components. The virtual USB bus may be established by installing a driver or a kernel extension on the computing device. For example if the computing device is a Macintosh computer, the virtual USB bus may be implemented as a kernel extension. In the embodiment shown in FIG. 9 a separate component is used to implement the virtual USB camera. This component may send USB commands to the virtual USB bus and communicate with the network camera over the network connection. By separating the virtual USB bus and USB camera, the amount of code running in kernel space may be minimized and in turn reduce the risk of unauthorized code being executed in kernel space. FIG. 10 shows a different embodiment the invention, where a single component implements both the virtual USB bus and the virtual USB camera. This component is shown running in kernel space. In another embodiment, the virtual USB bus may be implemented as a driver in a .DLL file, or by any other means permitted by the operating system. The virtual USB bus may relay information to the operating system about devices connected to it as well as commands sent by those devices. A person skilled in the art will understand that these components can be structured in a number of ways.

In an embodiment of the invention, the virtual USB bus may represent to the operating system that a USB camera is connected to it. The USB camera may be the only device connected to the bus, or one of many devices connected to the bus. In one embedment, the code necessary to represent the camera is included in the driver for the USB bus. In another embodiment, a separate driver or extension is used to represent the USB camera.

In one embodiment of the invention, the virtual USB bus relays USB packets from the camera to the operating system, and from the operating system to the camera. The USB camera may be represented as a single device complying with the USB Video Device Class, or it may be represented as multiple devices with different functions, for example a video device, an audio device, a motion detection device, a human interface device, and other devices relevant to a network camera.

The virtual USB camera may further establish a network connection to the physical network camera. In an embodiment of the invention this connection may be established over an Internet Protocol (IP) connection. In some embodiments, the virtual USB camera may detect the network camera on the network using mDNS, zeroconfig DNS or Apple Bonjour. The virtual USB camera may use an existing IP address assigned to the computing device, or may assign a new address exclusively to communicate with the network camera. The connection may be made using either IPv4 or IPv6. In another embodiment, the connection may be made using another lower level network protocol, such as Ethernet. When the connection is made over IP, the virtual USB camera may communicate with the network camera over HTTP. For example, the virtual USB camera may send an HTTP request to the network camera to get basic configuration data. The camera may respond by sending such data as Extensible Markup Language (XML) data or data encoded using JavaScript Object Notation (JSON). HTTP may be used to send configuration commands to the camera and to relay information back to the computing device.

In another embodiment of the invention, a driver for a virtual USB camera may be installed on the computing device. The driver may simulate the connection of a virtual USB camera to an existing USB bus. The existing USB bus may be physical or virtual.

In an embodiment of the invention, the virtual USB bus is monitoring the network connection to detect when a network camera is attached to it. This may be done using mDNS, zeroconfig DNS, Apple Bonjour or another discover protocol. In an embodiment of the invention, the virtual USB bus may signal to the operating system that a USB camera was connected to the bus once one is detected on the network. The virtual USB bus may allow multiple network cameras to be connected to the same virtual USB bus, or may establish a separate virtual USB bus for each network camera detected.

In an embodiment of the invention, the network camera implements a USB camera stack, and is able to receive USB packets from the operating system and send USB packets back to the operating system via the virtual USB camera. In an embodiment of the invention, the virtual USB camera encodes USB packets from the operating system using JSON and sends them to the network camera, that responds by sending a JSON encoded USB packet to the virtual USB camera. The virtual USB camera may then decode the USB packet and relay it to the operating system. In another embodiment, the network camera implements another communication standard, and the virtual USB camera maintains the USB connection to the bus and the operating system, and hides the details of the USB connection from the network camera.

In an embodiment of the invention, video and audio data is sent from the camera to the computing device using User Datagram Protocol (USP). In one embodiment, this may include sending audio and video data over Real Time Streaming Protocol (RTSP). The virtual USB camera may receive the RTSP stream from the camera and translate it into USB packets and send them as a USB stream pipe to the operating system. In another it may merely include sending encoded USB packets over UDP.

The virtual USB camera may send requests to the network camera to control aspects of the video and audio data such as frame-rate, bitrate, resolution and other properties. In one embodiment of the invention, such requests are sent as encoded USB packets compliant with the USB Video Device Class specification, whereas in other embodiments, the requests may be plain text encoded in JSON or XML.

In an embodiment of the invention where the network camera receives encoded USB packets, the network camera may simulate multiple USB cameras connected to different computing devices. For example, each camera may be connected to a bus at each computer, and the network camera may receive encoded USB packets from each computing device. The network camera may send different video streams to each computing device, or send a single stream to multiple computing devices.

Figure 11:
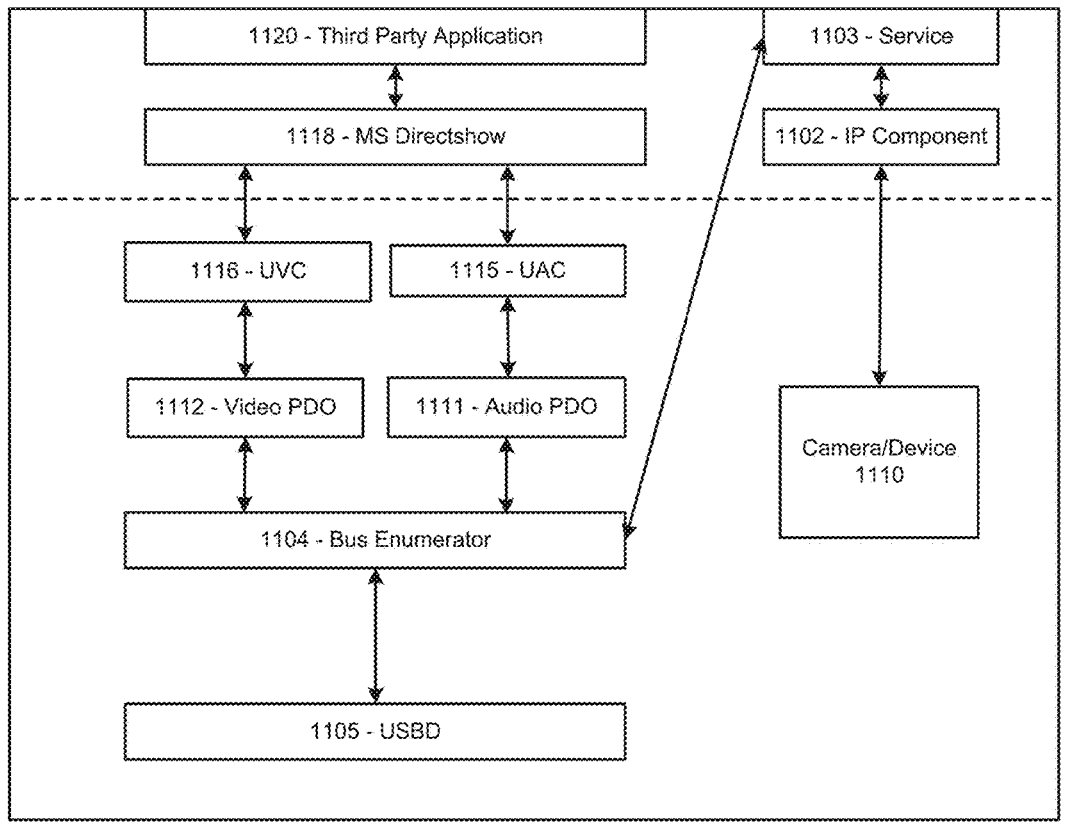
FIG. 11 shows an embodiment of the invention including a bus enumerator.

Embodiments of the invention may include a bus enumerator, such as shown in FIG. 11, that may include an application to enumerate and use a "broadcaster" camera as a regular USB webcam. For example, as shown in FIG. 11, a camera 1110 may be exposed to one or more third party application(s) 1120 via bus enumerator 1104. Embodiments may include developing a bus enumerator 1104 to create virtual Audio/Video USB devices. For example, a virtual Audio/Video USB device may response all the commands from MS UVC\UAC driver, such as shown in FIG. 11, e.g. UVC 1116, Video PDO 1112, UAC 1115 and Audio PDO 1111. These may each interact with the third party application 1120, e.g. via MS Directshow 1118 or other standardized suite, and communicate with the camera 1110 via bus enumerator 1104, user mode service 1103, and IP component 1102, as discussed further below.

In embodiments, camera control and data may use networking protocol, and USB webcam using USB (UAC, UVC) protocol, via application of the following techniques to make a two software protocol talk to each other:
a. User mode service 1103 which communicates between Kernel mode bus driver through a specially defined IRP.
b. User mode service 1103 converts networking information to USB information and vice versa.

Figure 12:
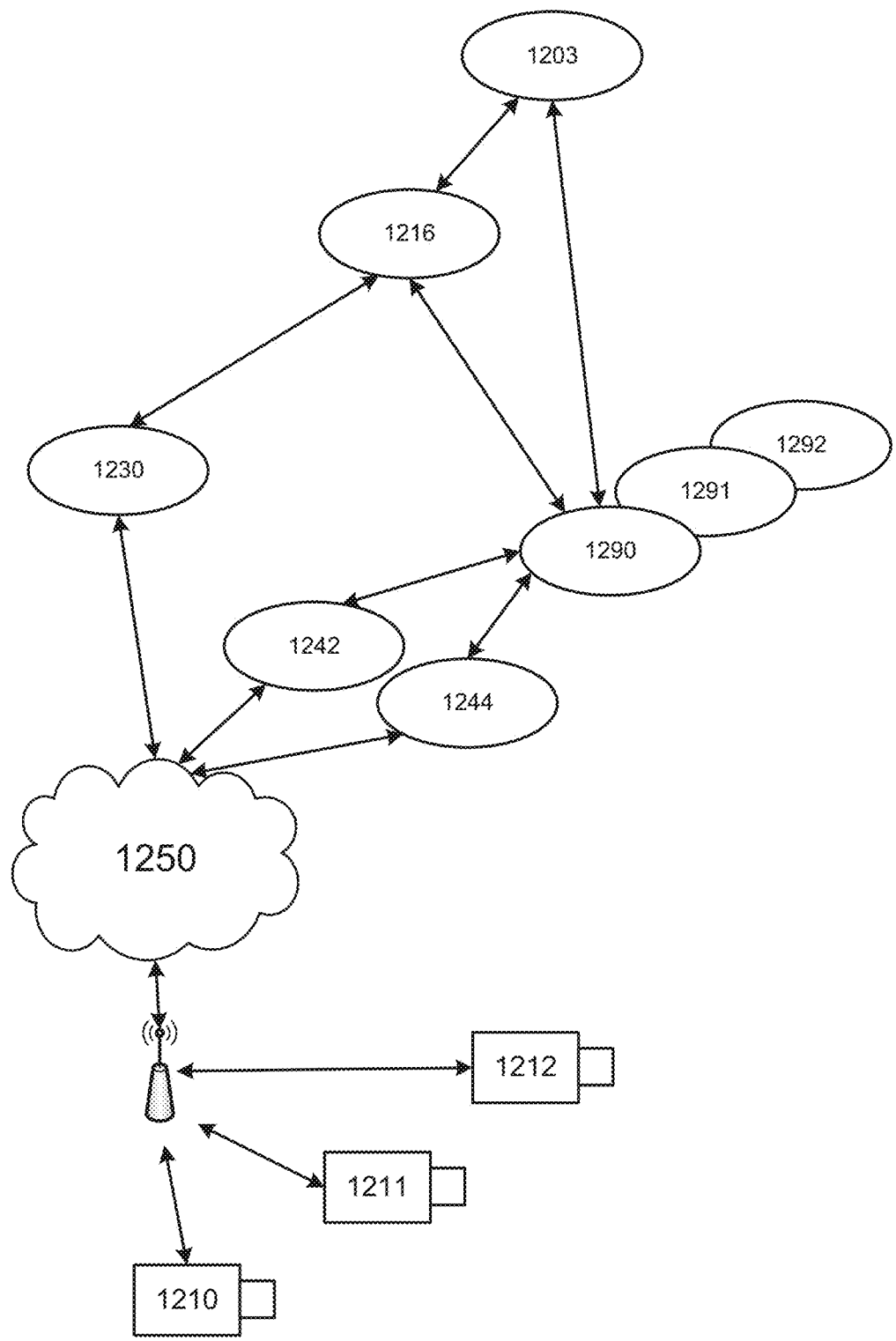
FIG. 12 shows details related to an IP component supporting multiple cameras according to aspects of the invention.

As conceptually shown in FIG. 12, an application or service 1203 may be exposed to a plurality of broadcaster cameras 1210-1212 supported by network 1250 via a camera manager 1216. In embodiments, a camera support service 1230 may instantiate the camera manager 1216, e.g. based on a user request to provide video and/or audio stream(s) from one or more cameras 1210-1212 to remote application or service 1203. The camera manager 1216 may, in turn, create memory instances 1290-1292 of the camera object(s), one per instance of camera 1210-1212 found. The camera object may then manage the RTSP and HTTP controls via RTSP session(s) 1242 and HTTP control(s) 1244, and deliver audio and/or video stream(s) from one or more cameras to the application or service 1203.

Embodiments may include an IP Component Interface, such as IP component 1102. The IP Component may include API(s) configured, for example, to emulate USB XU controls to ease integration with an application or service, and assist in virtual USB device emulation of the Broadcaster camera. The IP component 1102 may be configured to perform one or more of the following processes.

Discovery:
1. Verifies that the "Bonjour Service" (or other service discovery software) is installed and running.
2. Does mDNS Discovery
   Search for services of type:
      "_http._tcp"
      "_rtsp._tcp"
   Filters using "prod" field—must be:
      "Logi Broadcaster" (or other camera designator)
   For each "Logi Broadcaster" (or other specified camera) found, retrieve:
      version
      serial number
      HTTP control path and port
      HTTP event path and port
      HTTP broadcast path and port
      MJPEG path
      RTSP path and port
      RTSP preview path and port
      Camera hostname
      IP—by calling gethostbyname(Camera hostname)

In embodiments, the gethostbyname( ) results may be cached to speed up successive look-ups (important for multi-homed PCs, since Windows gethostbyname( ) typically attempts DNS lookups via ethernet before wife connection).

Online and Streaming States:
Periodically sends a JSON command to the camera over the control connection (every 2 seconds). This tells us if the camera is alive and well or not, and whether it is in broadcast or streaming mode.
Logi-Broadcaster ping is simply the following JSON string:
   JSON command: {"name":"get-streaming-mode"}
Tells mDNS to rescan services when Logi-Broadcaster ping times out (e.g. after 10 sec of no response).
Initial HTTP Connections:
Turns off Logi-Broadcaster ping to this camera.
Creates connections to the camera using the control and events paths and ports retrieved from mDNS.
HTTP Preview:
Creates 2 connections to the camera using the MJPEG path retrieved from mDNS. Uses one connection for control, and the second for streaming.
Broadcast Mode:
Creates 2 connections to the camera using the broadcast path retrieved from mDNS. Uses one connection for control, and the second for streaming.
RTSP Streaming:
Creates a RTSP session using the RTSP path and port retrieved from mDNS.
RTSP Preview Streaming:
Creates a RTSP session using the RTSP path and port retrieved from mDNS.

Encrypted Communications:
To encrypt HTTP communications between the client and the camera, a password and the IP of the network interface through which the client communicates with the camera may be used. On multi-homed clients, the Windows IP Helper function "GetBestInterface(camera IP)" may be used to determine this interface.

Figure 13:
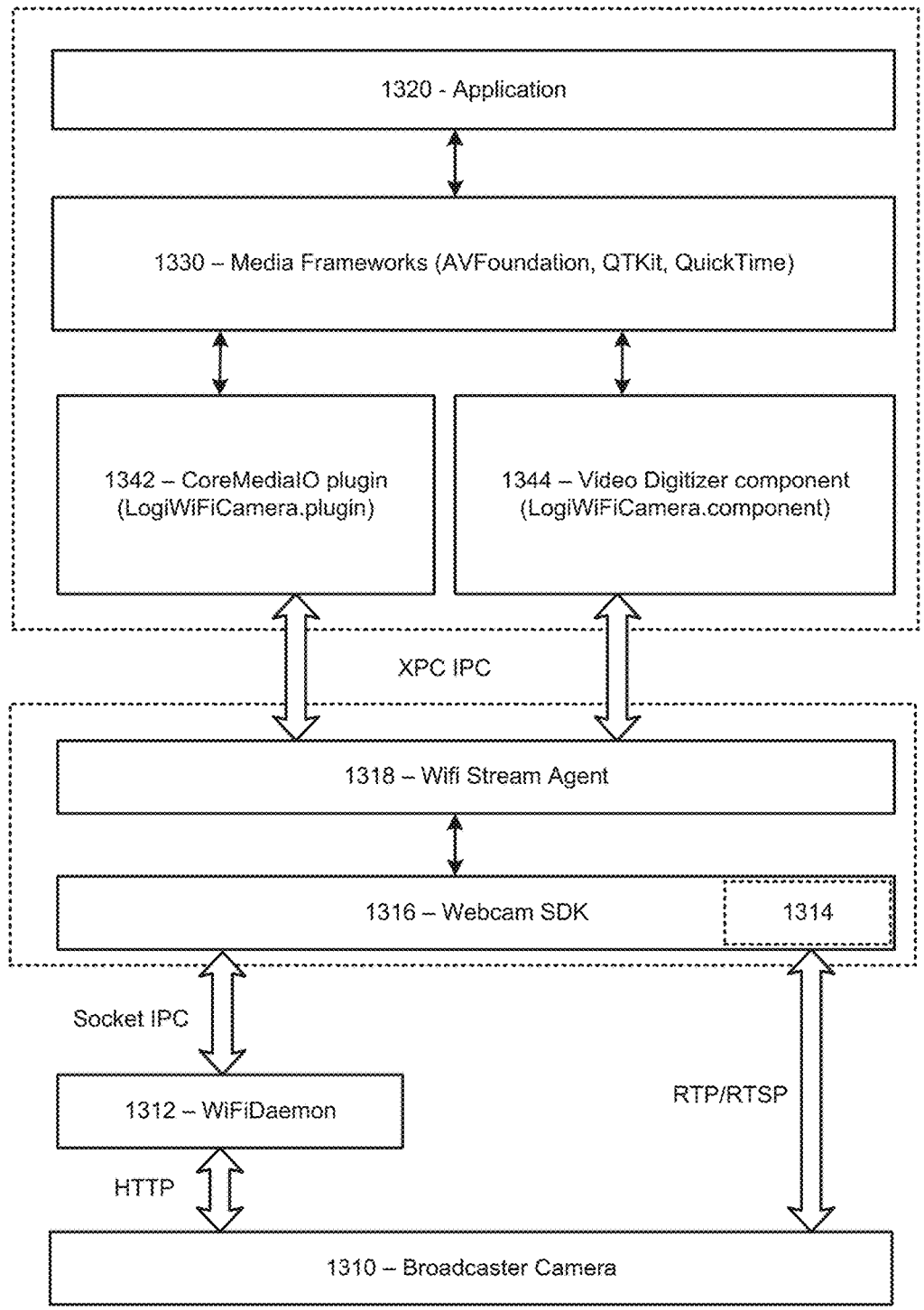
FIG. 13 schematically illustrates details related to a "broadcaster" camera with virtual audio and video features according to aspects of the invention.

FIG. 13 shows a design diagram for an exemplary networked environment 1300 including a Broadcaster Camera Virtual Video device. The Broadcaster camera 1310 is exposed to third party application(s) 1320 (using media frameworks 1330) by means of two plugins; a Video digitizer component 1344 (e.g., for 3rd party applications that use legacy APIs like QuickTime or Sequence Grabber) and a CoreMediaIO plug-in 1342 (e.g., for application using modern QTKit/AVFoundation frameworks). Both plugins communicate with the WiFiStreamAgent 1318 in order to initiate video stream from the Broadcaster camera 1310. This communication may use, for example, XPC APIs. The WiFiStreamAgent 1318 may communicate with the Broadcaster camera 1310 via WiFiDaemon 1312, and the Webcam SDK 1316 may include RTP 1314 that stream video and/or audio from the Broadcaster camera 1310.

Figure 14:
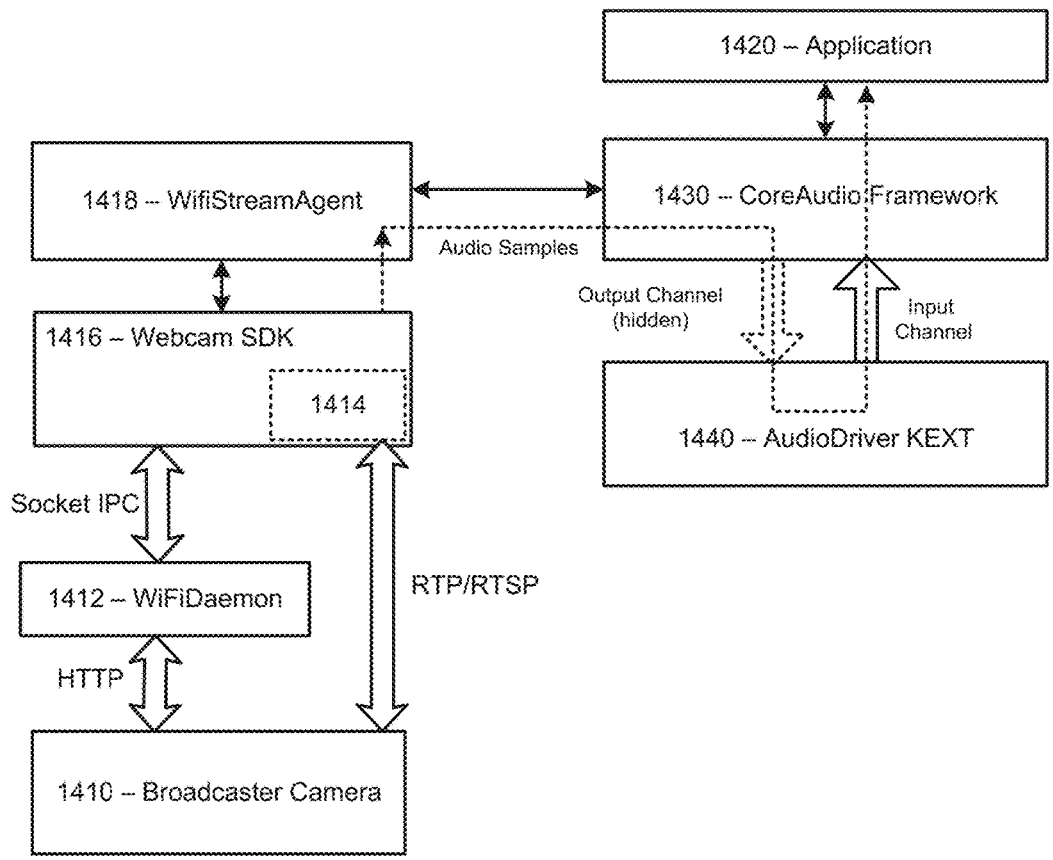
FIG. 14 schematically illustrates further details related to virtual audio features according to aspects of the invention.

FIG. 14 shows a design diagram of a Virtual Audio device environment 1400. Broadcaster camera 1410 may interact with webcam SDK 1416 (including RTP 1414), via RTP, RTSP for streaming video and/or audio and/or HTTP (e.g. via WiFiDaemon 1412) for command and control. Broadcaster camera 1410 is exposed to the third party applications 1420 as an audio input device by means of an Audio driver KEXT 1440. Audio driver KEXT 1440 may be a loopback audio driver that feeds the audio data received at the output channel back to the input channel. However the output channel is hidden from the third party applications. Only WiFiStreamAgent 1418 uses the output channel to send the audio data received from the Broadcaster camera 1410.

The WiFiStreamAgent 1418 may be a background process that drives both audio and video streaming sessions. This process may use webcam SDK 1416 to communicate with the camera 1410 to access the camera control information as well as audio and video streams.

Whenever a third party application initiates a video streaming, Plugins may communicate directly with the WiFiStreamAgent 1418 and get the video frames.

However in the case of audio stream, the workflow may be slightly different. The WiFiStreamAgent 1418 monitors the state of input channel of the audio driver KEXT 1440 using core audio framework 1430 APIs. The virtual device environment 1400 may be configured such that, whenever any third party application uses a microphone of the Broadcaster Camera 1410, WiFiStreamAgent 1418 receives a notification. WiFiStreamAgent 1418 may then initiate an audio streaming session with the camera 1410, and send the audio samples to the hidden output channel of the audio driver KEXT 1440, which is then sent to the input channel of the CoreAudio Framework 1430 and the application 1420, by the audio driver KEXT 1440.

Figure 15:
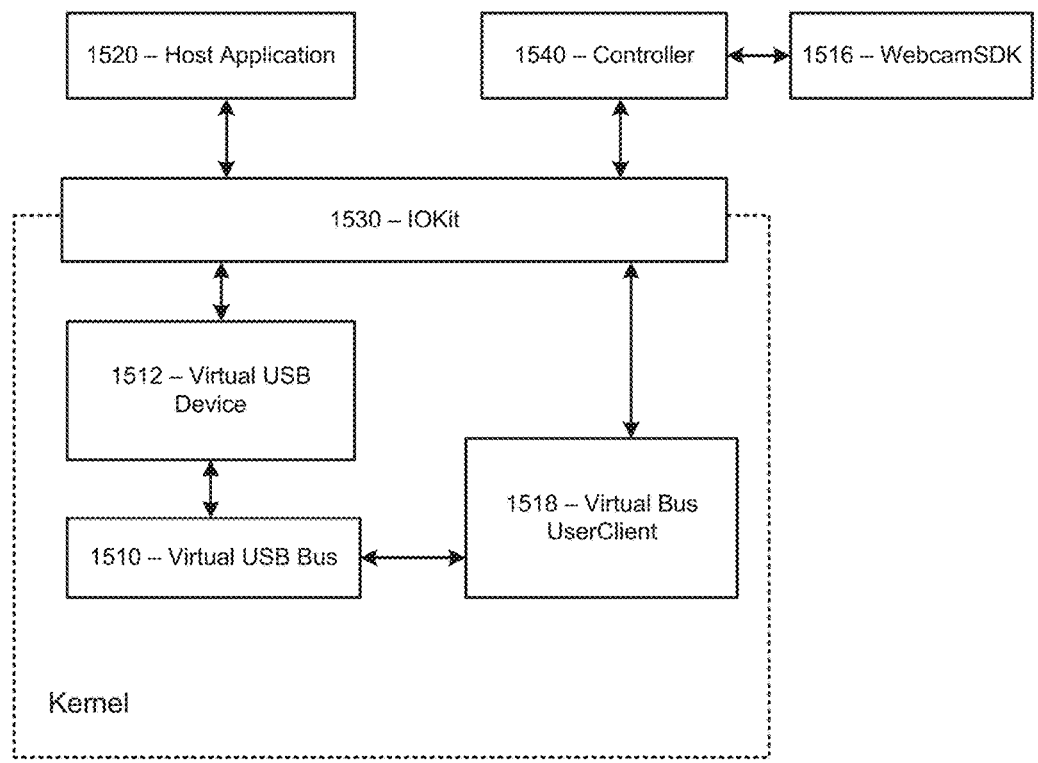
FIG. 15 schematically illustrates details related to an alternative control interface according to further aspects of the invention.

FIG. 15 shows an exemplary design for a Broadcaster Control Interface, according to certain aspects of the invention. An interface such as shown in FIG. 15 may be advantageous, for example, in situations where it is convenient for a third party application to control the properties of Broadcaster camera in the same way as they do for any other USB camera.

For example, on certain operating systems, such as Mac OS X, it may not be possible to create a virtual USB device as previously described. However, the inventors have found that a virtual USB bus 1510 (virtual host controller) may be created and used instead. The virtual USB bus 1510 may create a single virtual USB device 1512 with VID/PID matching the Broadcaster camera and expose only the control interface via IOKit 1530. Host application 1520 can communicate with this interface to adjust the camera properties in the same way as in case of any other USB device. Virtual USB Bus 1510 forwards these commands via Virtual Bus UserClient 1518 to a controller process 1540 in the user space. The controller process 1540 interprets these commands and sends the appropriate commands to the Broadcaster camera using Webcam SDK 1516, and returns the response back to the Virtual USB bus 1510, which in turn returns the response to the host application 1520.

In some embodiments, a computer-readable medium containing computer-readable instructions recorded thereon is provided. For example, memory unit 314 (FIG. 3) may store an application or computer program product accessible from a computer-usable or computer-readable medium providing program code for use by or in connection with device 300 (FIG. 3) or any instruction execution system. For the purposes of this description, a computer-usable or computer-readable medium may include any tangible medium or apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks may include compact disc read-only memory (CD-ROM), a rewritable compact disc (CD-R/W), and digital video disc (DVD).

A data processing system (e.g., including controller 302 (FIG. 3)) is suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

While various embodiments have been described above in the context of a master-slave arrangement, any wireless protocol using any wireless communication standard may be supported by the systems and methods described herein. In addition, although Bluetooth devices are specifically used in some of the illustrative examples described herein, any electronic device may be adapted to support the facilitated device connection and pairing techniques disclosed herein. For example, devices may initiate facilitated connections with other devices, peripherals and APs. Furthermore, it is to be understood that the various embodiments described above may be used and adapted for other types of delays not specifically described herein. It is to be understood that the examples and embodiments described above are for illustrative purposes only and that various modifications or changes in light thereof will be suggested to persons skilled in the art, and are to be included within the spirit and purview of this application and scope of the appended claims. Therefore, the above description should not be understood as limiting the scope of the invention as defined by the claims.

What is claimed is:

1. A method of sharing audio data between a first device, a second device and a remote service, comprising:
   establishing a first wireless connection between the first device and the second device;
   establishing a second connection between the first device and the remote service;
   sending identification information related to the first device from the second device to the remote service;
   receiving an audio stream at the second device from the remote service based on the identification information;
   establishing a plurality of wireless connections between the second device and a plurality of devices including the first device,
   wherein establishing the plurality of wireless connections includes a protocol negotiation based on one or more of an anticipated power requirements analysis for the plurality of devices, an anticipated usage requirements analysis for the plurality of devices, and anticipated or mandated security requirements associated with the plurality of devices, and
   wherein the audio stream is communicated from the first device to the remote service without being processed by the second device, and the audio stream is communicated from the remote service to the second device without further processing by the first device.

2. The method of claim 1, wherein the first wireless connection includes a control channel for allowing the second device to control the first device.

3. The method of claim 1, wherein the first wireless connection includes an audio channel for allowing the second device to receive another audio stream from the first device.

4. The method of claim 1, wherein the second device is at least one of a wireless camera, a personal computer, a smart phone or a remote control.

5. The method of claim 1 wherein the second connection includes a wireless connection.

6. The method of claim 1 further comprising adjusting a parameter of the audio stream in response to performance data.

7. The method of claim 6 wherein the performance data includes at least one of latency, audio quality and processor workload.

8. The method of claim 6 wherein adjusting the parameter of the audio stream includes changing at least one of a compression ratio, a compression rate, a frame-rate, and a key-frame interval.

9. The method of claim 6 wherein adjusting the parameter of the audio stream includes selecting the parameter to be adjusted from a plurality of parameters based on at least one of the performance data, or an analysis of the first audio stream.

10. The method of claim 6 further comprising adjusting parameters of a plurality of network devices sharing a common Internet connection to a second network node.

11. The method of claim 6 further comprising adjusting a compression ratio of the audio stream based on the performance data.

12. The method of claim 6 further comprising:
receiving information indicating that the quality of an audio stream is below a predetermined threshold; and
reducing the bitrate of the audio stream.

13. A method of sharing audio data between an audio capture device having a microphone, a host device and a remote service, comprising:
establishing a first wireless connection between the audio capture device and the host device;
establishing a second connection between the audio capture device and the remote service;
sending identification information related to the audio capture device from the host device to the remote service;
receiving an audio stream at the host device from the remote service based on the identification information;
establishing a plurality of wireless connections between the host device and a plurality of devices including the audio capture device,
wherein establishing the plurality of wireless connections includes a protocol negotiation based on one or more of an anticipated power requirements analysis for the plurality of devices, an anticipated usage requirements analysis for the plurality of devices, and anticipated or mandated security requirements associated with the plurality of devices, and
wherein the audio stream is communicated from the audio capture device to the remote service without being processed by the host device, and the audio stream is communicated from the remote service to the host device without further processing by the audio capture device.

14. The method of claim 13, wherein the first wireless connection includes a control channel for allowing the host device to control the audio capture device.

15. The method of claim 13, wherein the first wireless connection includes an audio channel for allowing the host device to receive another audio stream from the audio capture device.

16. The method of claim 13, wherein the host device is at least one of a wireless camera, a personal computer, a smart phone or a remote control.

17. The method of claim 13 wherein the second connection includes a wireless connection.

18. The method of claim 13 further comprising adjusting a parameter of the audio stream in response to performance data.

19. The method of claim 18 wherein the performance data includes at least one of latency, audio quality and processor workload.

20. The method of claim 18 wherein adjusting the parameter of the audio stream includes changing at least one of a compression ratio, a compression rate, a frame-rate, and a key-frame interval.

* * * * *